(12) United States Patent
Kelsey et al.

(10) Patent No.: US 7,704,621 B2
(45) Date of Patent: Apr. 27, 2010

(54) BATTERIES AND BATTERY SYSTEMS

(75) Inventors: G. Steven Kelsey, Nashua, NH (US);
Yelena Kouznetsova, Brookfield, CT (US); Boris Makovetski, Danbury, CT (US); Sathya Motupally, Stamford, CT (US); Jonathan O'Neill, New Fairfield, CT (US); David L. Pappas, Danbury, CT (US); Robert Pavlinsky, Stratford, CT (US); Oleg Podoprigora, New Milford, CT (US); Thomas Richards, Harvard, MA (US); William Wandeloski, New Milford, CT (US)

(73) Assignee: The Gillette Company, Boston, MA (US)

( * ) Notice: Subject to any disclaimer, the term of this patent is extended or adjusted under 35 U.S.C. 154(b) by 1039 days.

(21) Appl. No.: 11/397,771

(22) Filed: Apr. 4, 2006

(65) Prior Publication Data
US 2006/0204835 A1    Sep. 14, 2006

(51) Int. Cl.
*H01M 4/00* (2006.01)
*H01M 2/12* (2006.01)
(52) U.S. Cl. .............................. 429/27; 429/82; 429/28; 429/86
(58) Field of Classification Search .................. 429/86, 429/27, 82, 65, 28, 7, 165, 185
See application file for complete search history.

(56) References Cited

U.S. PATENT DOCUMENTS

| | | | |
|---|---|---|---|
| 5,306,580 A | 4/1994 | Mansfield, Jr. et al. | |
| 5,985,475 A | 11/1999 | Reynolds et al. | |
| 6,492,046 B1 * | 12/2002 | Payne et al. | 429/27 |
| 6,528,214 B1 | 3/2003 | Pliner et al. | |
| 7,045,247 B1 * | 5/2006 | Copeland et al. | 429/164 |
| 2005/0016605 A1 | 1/2005 | Sherman et al. | |

FOREIGN PATENT DOCUMENTS

| | | | |
|---|---|---|---|
| DE | 19914571 | | 1/2001 |
| EP | 0 940 866 | | 9/1999 |
| EP | 0940866 | * | 9/1999 |
| JP | 55-157875 | | 12/1980 |
| WO | WO 01/13455 | | 2/2001 |

* cited by examiner

*Primary Examiner*—Raymond Alejandro
(74) *Attorney, Agent, or Firm*—Fish & Richardson P.C.

(57) ABSTRACT

A battery includes a cathode having an interior surface and an exterior surface, and defining a cavity and two open ends; a separator disposed adjacent to the interior surface of the cathode; an anode disposed adjacent to the separator and inside the cavity; an air-permeable, liquid-impermeable barrier layer disposed adjacent to the exterior surface of the cathode, and defining an exterior surface of the battery; two end members connected to the open ends of the cathode; and an anode current collector extending through the two end members. Methods designed such a battery is also disclosed.

12 Claims, 19 Drawing Sheets

BATTERIES AND BATTERY SYSTEMS

CLAIM OF PRIORITY

This application claims priority under 35 USC §119(e) to U.S. Ser. No. 10/060,701, filed Jan. 30, 2002, and entitled "Batteries and Battery Systems", now U.S. Pat. No. 7,065, 617, which claims priority from U.S. Provisional Patent Application Ser. No. 60/265,822, filed on Feb. 1, 2001, and entitled "Battery", the entire contents of which are hereby incorporated by reference.

TECHNICAL FIELD

This invention relates to batteries and battery systems.

BACKGROUND

Batteries are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material. In order to prevent direct reaction of the anode material and the cathode material, the anode and the cathode are electrically isolated from each other by a separator.

When a battery is used as an electrical energy source in a device, electrical contact is; made to the anode and the cathode, allowing electrons to flow through the device and permitting the respective oxidation and reduction reactions to occur to provide electrical power. An electrolyte, for example, potassium hydroxide in contact with the anode and the cathode contains ions that flow through the separator between the electrodes to maintain charge balance throughout the battery during discharge.

In a metal-air electrochemical cell, oxygen is reduced at the cathode, and a metal is oxidized at the anode. Oxygen is supplied to the cathode from the atmospheric air external to the cell through one or more air hole(s) in the cell can.

To prolong battery life, it is desirable that the cathode be exposed to air flow when in use, and isolated from air flow when not in use. During use, it is desirable to provide uniform and sufficient air access to the cathode to provide, for example, uniform discharge of the active materials and/or a relatively high discharge voltage profile.

SUMMARY

This invention relates to batteries and battery systems.

In one aspect, the invention features a non-hermetically sealed, electrochemical power source having a first electrode, a second electrode, a separator between the first electrode and the second electrode, and a membrane in fluid communication with an environment external to the battery, the second electrode being between the separator and the membrane. The membrane includes a first portion having a density different than a second portion of the membrane.

In another aspect, the invention features a non-hermetically sealed, electrochemical power source having a first electrode, a second electrode, a separator between the first electrode and the second electrode, and a membrane in fluid communication with an environment external to the battery, the second electrode being between the separator and the membrane. The membrane has a first portion having a porosity different than a second portion of the membrane.

In another aspect, the invention features a non-hermetically sealed, electrochemical power source including a first electrode, a second electrode, a separator between the first, electrode and the second electrode, and a material in fluid communication with an environment external to the battery, the second electrode being between the separator and the material. Gas permeability across a first portion of the material is different than gas permeability across a second portion of the material.

In another aspect, the invention features a non-hermetically sealed, electrochemical power source having a first electrode, a second electrode, a separator between the first electrode and the second electrode, and a membrane in fluid communication with an environment external to the battery, the second electrode being between the separator and the membrane. The membrane has a first portion having a mass transport resistance different than a second portion of the membrane.

In another aspect, the invention features a non-hermetically sealed, electrochemical power source having a first electrode, a second electrode, a separator between the first electrode and the second electrode. The separator comprises a first portion having a mass transport resistance different than a second portion of the separator.

Embodiments of the aspects of the invention may include one or more of the following features. The power source further includes a container having an air access opening, wherein the first portion is adjacent to the air access opening and has a density higher than the second portion. The second portion is farther from the air access opening than the first portion is from the air access opening. The first portion is aligned with the air access opening. The first portion has an area greater than the area of the air access opening. The membrane is permeable to a gas. The first and second portions are integrally formed as one component. The membrane includes polytetrafluoroethylene. The power source is a metal-air cell. The power source further includes a container having a plurality of air access openings, wherein the membrane has uniform mass transport resistance to a gas flowing through the air access openings.

In another aspect, the invention features a battery cartridge including a housing having a plurality of air access openings configured to selectably control flow of a gas into the housing, and an electrochemical cell in the housing, the cell having a top surface adjacent to the air access openings and a side surface. The openings are positioned over the side surface of the cell, and the housing is free of openings completely over the top surface of the cell.

Embodiments may include one or more of the following features. The cartridge includes two adjacent electrochemical cells in the cartridge, the cells defining a gap; therebetween, wherein the openings are only positioned over the side surfaces of the cells and over the gap. The cartridge includes two adjacent electrochemical cells in the cartridge, the cells defining a gap therebetween, wherein the openings are only positioned over the side surfaces of the cells or over the gap. The openings are off-centered away from the cell. The openings are centered over the side surface of the cell.

Embodiments may include one or more of the following advantages. The batteries and/or battery systems may have relatively long activated shelf life. The batteries and/or battery systems may have relatively high utilization of active materials. The batteries and/or battery systems, may have enhanced uniformity in the current distribution or density. As a result, relatively uniform flooding and/or improved utilization of active materials can be achieved. The batteries and/or battery systems can be useful for high current or rate applications or devices.

In one aspect, the invention features a battery, such as a metal-air battery, having a cathode having an interior surface and an exterior surface and defining a cavity, a separator disposed adjacent to the interior surface of the cathode, an anode disposed adjacent to the separator and inside the cavity, and an air-permeable, liquid-impermeable barrier layer disposed adjacent to the exterior surface of the cathode, the barrier layer defining an exterior surface of the battery. Thus, the cathode serves as a container or a case for the battery.

The cathode can define two open ends. Two end members can be connected to the open ends of the cathode, and an anode current collector can extend through the two end members.

Embodiments of the invention may include one or more of the following features. The cathode includes a current collector, and the battery further includes a conductive tab connected to the current collector. The current collector is connected together to form a seam, and the conductive tab is connected to the current collector along the seam. The battery further includes a sealant disposed over the conductive tab. The barrier layer includes. polytetrafluoroethylene. The end members are configured to mate with the cathode and align with the cathode, along a longitudinal axis of the battery. The battery further includes a conductive tab connected to the anode current collector. The end members and the cathode are connected by a sealant. The end members comprise an electrically-insulating material, such as acrylonitrile-butadiene-styrene. The separator is glued to the cathode. The barrier layer is laminated to the cathode.

The cathode can have a substantially rectangular, substantially square cross, substantially triangular, or substantially circular cross section.

The battery can be dimensioned to fit inside a housing adapted to manage air flow into and out of the housing.

In another aspect, the invention features a method of making a battery. The method includes placing a first layer adjacent to a cathode, the first layer being electrically-insulating, placing a second layer adjacent to the cathode, the second layer being air-permeable and liquid-impermeable, and forming the cathode wherein the second layer defines an exterior surface of the battery. The method can also include mating the formed cathode with two end members and connecting the end members to the cathode with a sealant, wherein mating the formed cathode with the two end members includes placing an anode current collector through the end members.

Embodiments of the invention may include one or more of the following features. Placing the second layer adjacent to the cathode includes laminating the second layer to the cathode. Placing the first layer adjacent to the cathode includes gluing the first layer to the cathode. Forming the cathode includes defining a cavity with the cathode, and the method further includes placing an anode in the cavity. The cathode includes a current collector, and forming the cathode further includes connecting the current collector together to form a seam. The method further includes connecting a conductive tab to the current collector. The method further includes placing a sealant on the conductive tab.

Other features and advantages of the invention will be apparent from the description of the preferred embodiments thereof and from the claims.

DETAILED DESCRIPTION OF THE PREFERRED EMBODIMENTS

Figure 1:
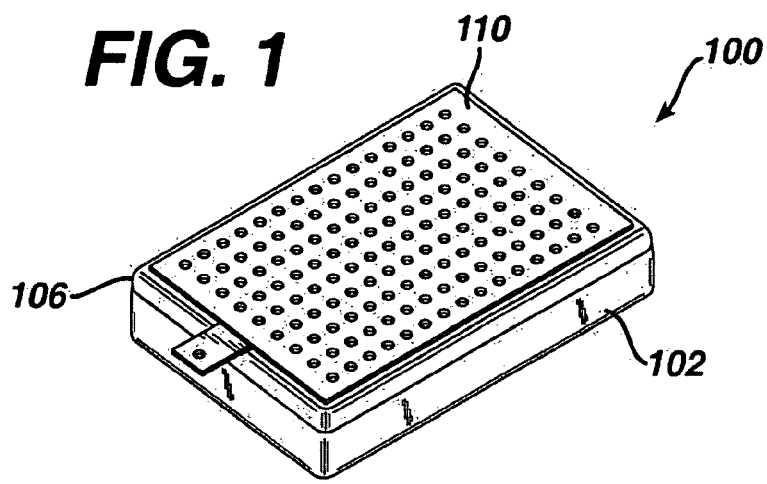
FIG. 1 is a perspective view of an embodiment of a battery cartridge.
Figure 2:
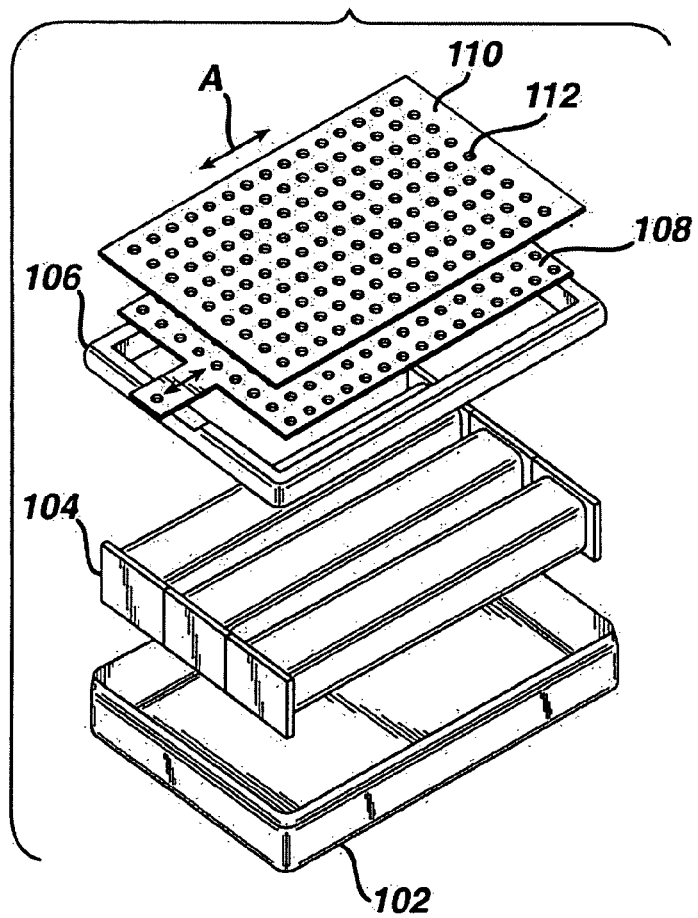
FIG. 2 is an exploded perspective view of the battery cartridge of FIG. 1, shown with electrochemical cells.
Figure 3:
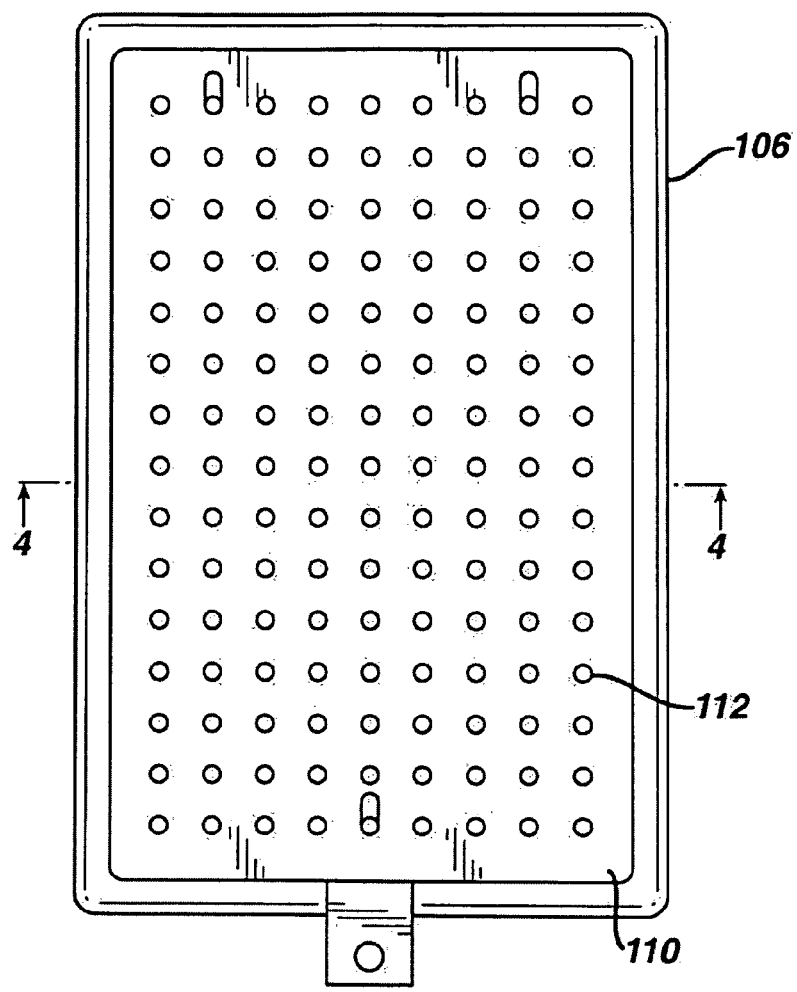
FIG. 3 is a plan view of the battery cartridge of FIG. 1.
Figure 4:
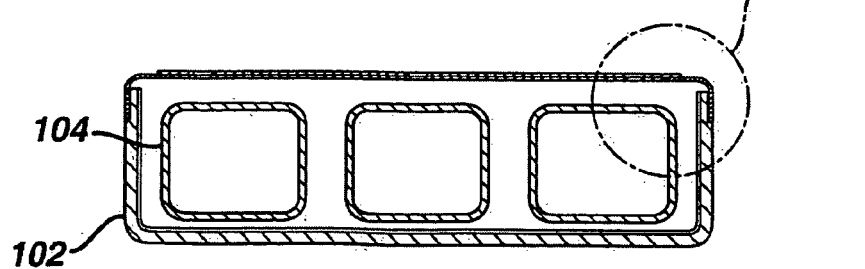
FIG. 4 is a cross sectional view of the battery cartridge of FIG. 3, taken along line 4-4
Figure 5:
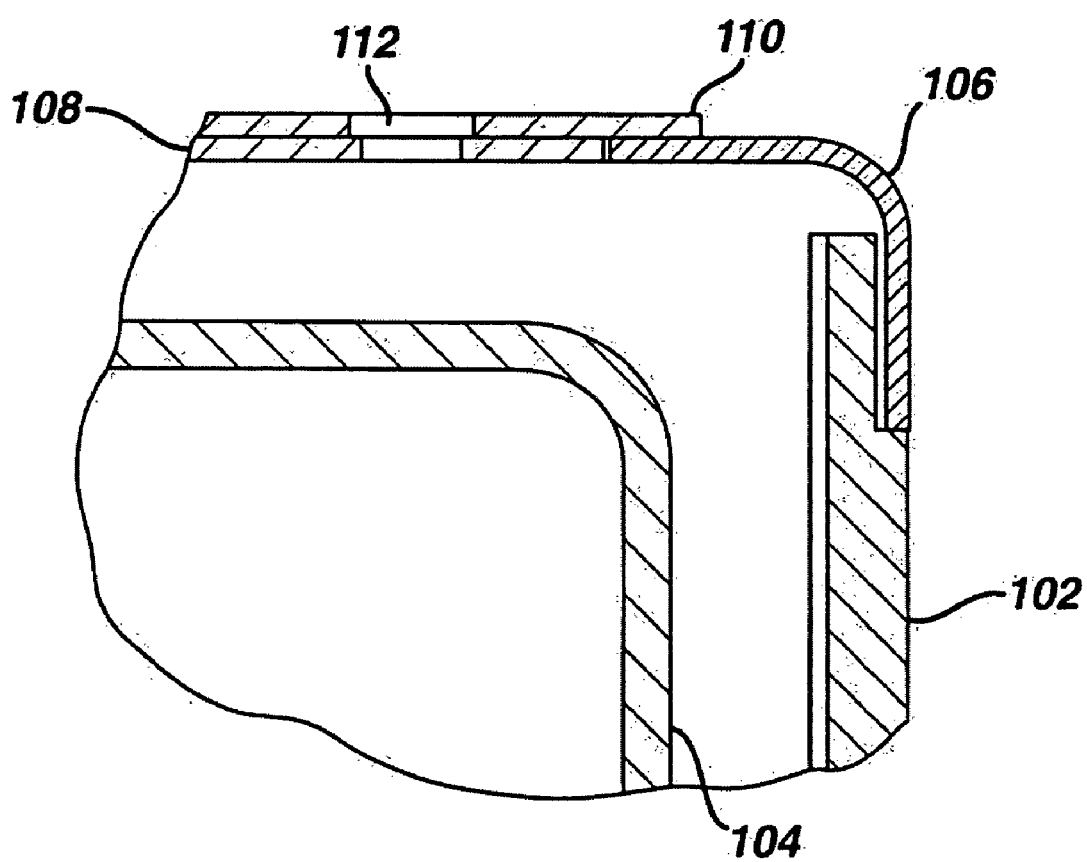
FIG. 5 is a detailed view of the battery cartridge of FIG. 4.

Referring to FIGS. 1-5, a rectangular prismatic battery cartridge or pack 100 includes a casing 102, here, shown with a plurality of metal-air cells 104 (e.g., three) inside the casing. Casing 102 is shaped as a rectangle having a wall extending around the periphery of the rectangle. Cartridge 100 further includes a valve frame 106 fitted over casing 102, a moveable air valve 108, and a fixed air valve 110. Valves 108 and 110 each has a pattern of air access openings or holes 112 that can align (e.g., complete overlap), partially align (e.g., some overlap), or misalign (e.g., no overlap) with each other when moveable air valve 108 is slid in a plane defined by valve 108 (FIG. 1, arrow A).

When cartridge 100 is used in a device, such as a cellular telephone, moveable air valve 108 can be positioned, e.g., slid, relative to fixed air valve 110 according to a mode of operation of the device. For example, when the device is in an "off" mode, holes 112 of valves 108 and 110 are completely or substantially completely misaligned. Cartridge tightly or sufficiently seals cells 104 from the environment. Air flow to cells 104 is restricted to enhance the service life of the cells, e.g., by protecting the cells from self-discharge and/or by minimizing premature degradation of battery materials from excessive exposure to air. When the device is in a "standby" mode, holes 112 of valves 108 and 110 are partially aligned. Air flow to cells 104 is balanced, for example, so that a sufficient amount of air may reach the cells to satisfy the device's power and/or power up requirements during the standby mode. When the device is in an "on" mode (e.g., "talk" mode for a cellular telephone), holes 112 are completely or substantially completely aligned. In this mode, sufficient air reaches cells 104 to allow the cells to operate at full or substantially full levels.

In some embodiments, pack 100 further includes a low friction, absorbent layer (e.g., Whatman paper (P3) having a non-woven polyamide fiber fabric) that extends across casing 102 between movable air valve 108 and cells 104. Pack 100 can further include a porous layer (e.g., a polyurethane open-cell foam) between the absorbent layer and cells 104. Pack 100 can further include an absorbent layer with a hydrophobic vapor barrier (e.g., Whatman paper (P3) having a polytetrafluoroethylene film) between the porous layer and cells 104. Other embodiments of battery packs or cartridges, including methods of use and operation, are described in commonly-owned U.S. Ser. No. 09/693,010, filed Oct. 20, 2000, and entitled "Battery Systems", now U.S. Pat. No. 6,384,574, hereby incorporated by reference in its entirety.

Figure 6:
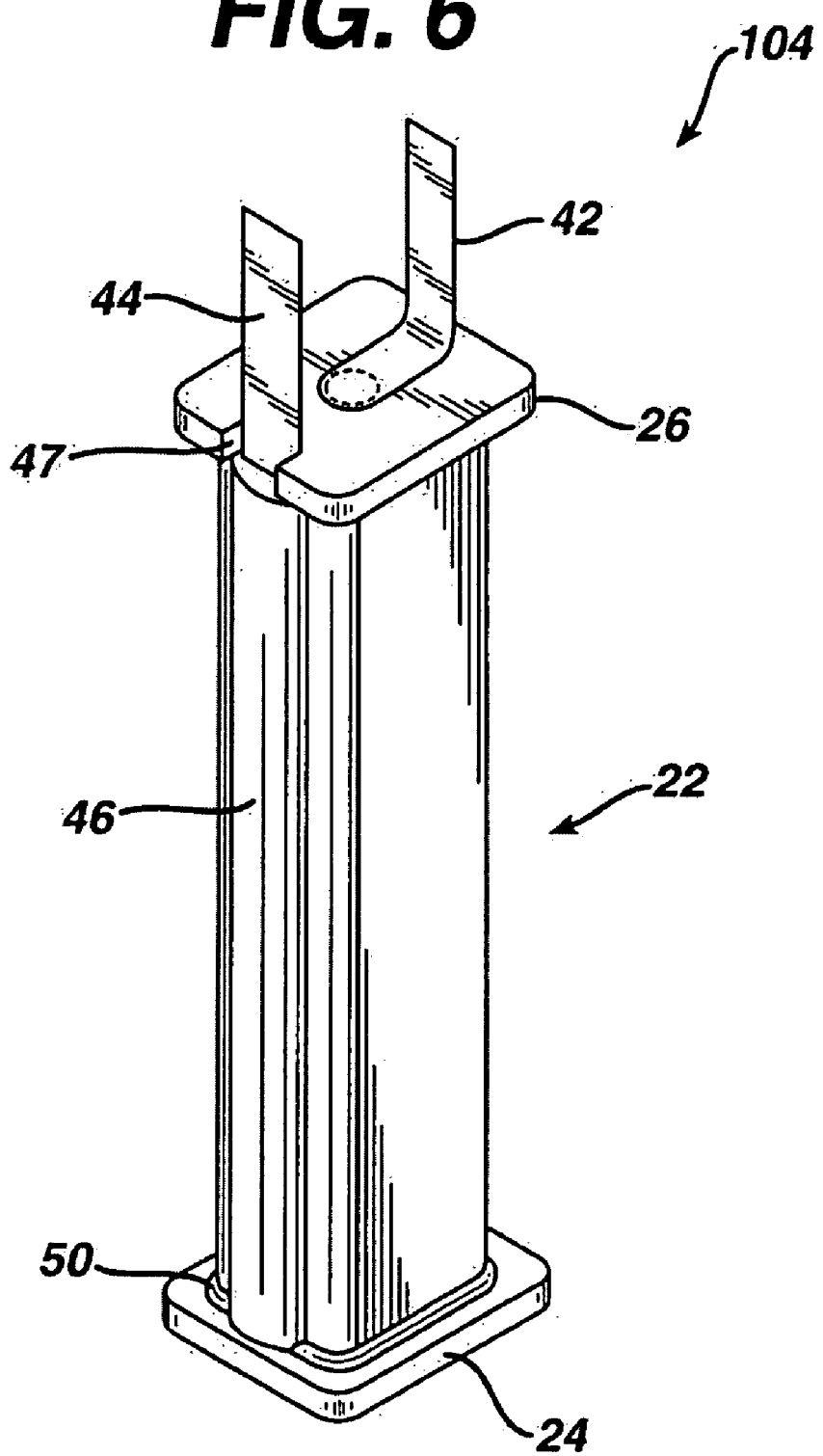
FIG. 6 is a perspective view of an embodiment of an electrochemical cell.
Figure 7:
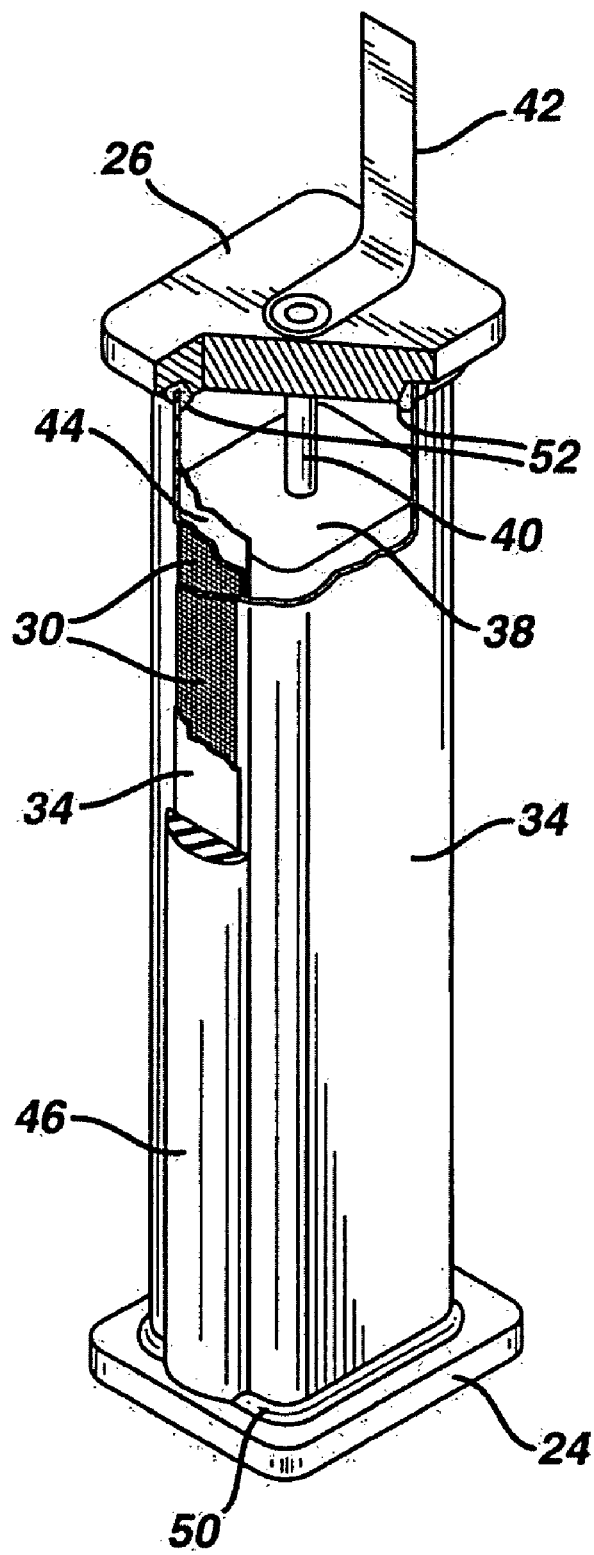
FIG. 7 is partially cut-away view of the cell of FIG. 6.
Figure 8:
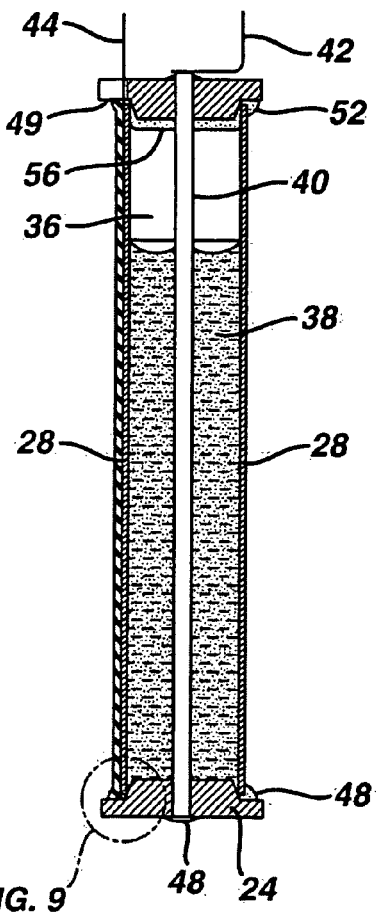
FIG. 8 is a cross-sectional view of the cell of FIG. 6
Figure 9:
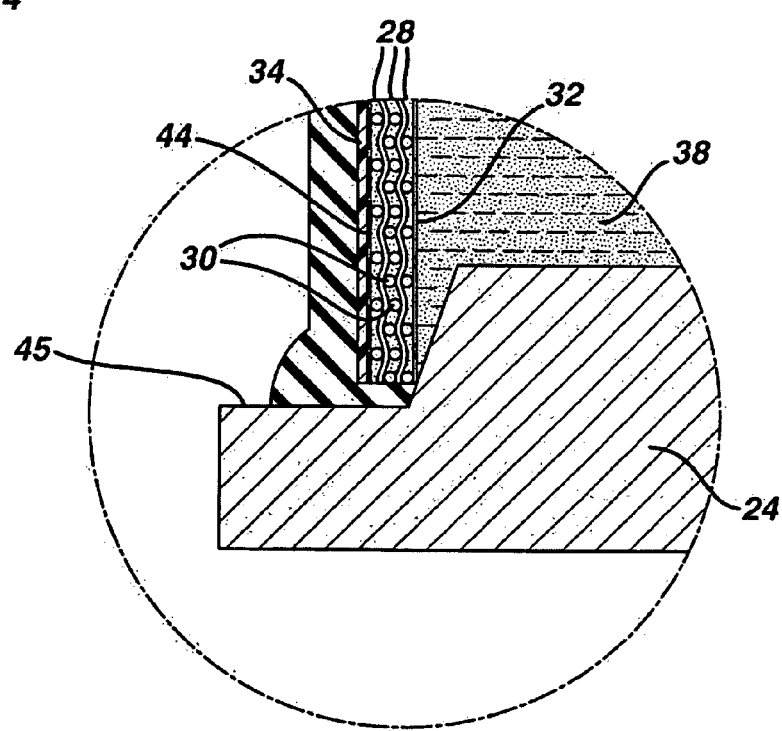
FIG. 9 is a detailed view of the cell of the FIG. 8.

Cells 104 are prismatic metal-air electrochemical cells configured to be placed inside cartridge 100. Referring to FIGS. 6 and 7, metal-air cell 104 includes a cathode assembly 22, a bottom end member 24 connected to an end of assembly 22, and a top end member 26 connected to the other end of assembly 22. Cathode assembly 22 includes a cathode 28 formed on a current collector 30, a separator 32 glued to an interior side of cathode 28, and a barrier layer 34, e.g., a polytetrafluoroethylene (PTFE or Teflon®) layer, wrapped around an exterior side of cathode 28. Cathode assembly 22 is formed, e.g., wrapped, to define a cavity 36. Cell 104 further includes an anode 38 and an anode current collector 40 disposed in cavity 36. Anode current collector 40 extends from bottom end member 24, through cavity 36, and through top end member 26. A negative tab 42 is connected to anode current collector 40, and a positive tab 44 is connected to cathode current collector 30. When cell 104 is fully assembled, barrier layer 34 defines an exterior surface of the battery. That is, cell 104 does not include a housing, such as a cylindrical metal container or can, exterior to barrier layer 34. During use, oxygen from the air flows through holes 112, passes through barrier layer 34, contacts cathode 28 and is reduced as part of the cells' electrochemical reactions to provide electrical energy. Cells 104 are described in more detail below and in incorporated-by-reference U.S. Ser. No. 60/265,822.

Modified Barrier Layer

Without wishing to be bound by theory, it is believed that in metal-air packs, there are two mass transport resistances, e.g., for materials such as oxygen and water. One transport resistance is at the pack level and the other at the cell level. At the pack level, the mass transport resistance, e.g., to oxygen, is in part a function of the plenum depth (the distance between cells 104 and moveable air valve 108), and placement and area of the air access holes. At the cell level, activated shelf life for the pack depends on water transport into and/or out of the cells. The vapor pressure of water in the cathode (which is dependent on the concentration of the electrolyte) and/or the relative humidity of the air in contact with the membrane are also variables that affect the water vapor flux. Generally, water transport out of the cells can shorten a cell's activated shelf life. Therefore, in some cases, it is preferable to maximize the mass transport resistance to water to minimize water flux.

Furthermore, it is believed that in embodiments in which barrier layer 34 is uniform around cell 104, the oxygen concentration at the top of the cell at the barrier layer/cathode interface is about at least 30% greater than the oxygen concentration at the two sides of the cell. This may be because the top of the cell is closer, i.e., a shorter diffusion path, to the air access holes than the sides. This difference in the oxygen transport paths may result in a non-uniform current distribution at the cathode, which in turn can result in a non-uniform reaction plane movement in the anode and lowered anode utilization. Reducing this non-uniformity in oxygen partial pressure can provide a relatively more uniform current distribution and therefore increased anode utilization. Thus, it is believed that to enhance performance, uniform oxygen access is preferably maximized and/or water transport is preferably minimized.

Accordingly, in embodiments, barrier layers 34 of cells 104 are modified or altered to affect, e.g., increase or decrease, the mass transport resistance of the cells. For example, altering the properties of barrier layer 34 at the top of the cells can allow less water vapor to enter and/or exit the Teflon barrier layer or the plenum, thereby allowing the cells to retain water relatively longer. Altering the top side can also enhance the cell performance because the oxygen partial pressure can be relatively more uniform on the sides of cells 104, thereby enhancing anode utilization.

In some embodiments, one or more portions of barrier layer 34 are modified relative to another portion(s) of the barrier layer to adjust the rate of flow of materials, such as oxygen and water, through the barrier layer. Portion(s) of barrier layer 34 can have different mass transport resistance or permeability to selected material(s) than other portion(s) of the barrier layer. Portion(s) of barrier layer 34 can have different porosity than other portion(s) of the barrier layer. Portion(s) of barrier layer 34 can have different apparent density than other portion(s) of the barrier layer. In embodiments, one or more portions of barrier layer 34 are not uniform around the cells.

Numerous methods can be used to modify, e.g., increase or decrease, properties of barrier layer 34, such as the mass transport resistance of a material, e.g., water and/or oxygen, through the layer. In some embodiments, barrier layer 34 is mechanically worked. Barrier layer 34 can be, for example, thumped, compressed, deformed, and/or stretched. Thumping and/or compressing can be, performed using an appropriately-sized die, such as a blunt point or an awl. For example, mechanically working the barrier layer can result in variable porosity in which the porosity of the worked areas is lower than areas not worked, in variable density in which the density of the worked areas is higher than areas not worked, and/or in variable mass transport resistance in which transport resistance increases in worked areas relative to areas not worked.

The degree of modification can vary and can be controlled, for example, by controlling the amount of work applied. In embodiments, relative to an area that is not altered, the altered areas can have a lower porosity, e.g., 90%, 80%, 70%, 60%, 50%, 40%, 30%, 20%, or 10% of the porosity of the unaltered area. The unaltered and altered areas can have similar differences in terms of mass transport resistance and/or density.

Other methods of modifying the mass transport resistance of a material include chemical methods. For example, to increase mass transport resistance, a selected area can be modified by applying, e.g., painting, spraying, or coating, with a material that hinders, e.g., water and/or oxygen flux. Examples of suitable materials include an epoxy, a fluoroliquid (such as Kel-F oil), or a glue. Selected areas can be injected with a material, such as a chemical precursor or reactant, that obstructs or clogs the areas. For example, the injected material can react with the anode to form ZnO and clog barrier layer 34.

In some embodiments, the thickness of barrier layer 34 can be modified, e.g., to affect mass transport resistance. Multiple layers of barrier layer 34 can be used in selected areas, e.g., at the top of the cells, to increase the mass transport resistance of the areas. Barrier layer 34 can be formed, e.g., extruded, with selected areas having a thickness different, e.g., greater, than other areas. The extra thickness of barrier layer needed to obtain similar results as a 50% decrease in porosity can be estimated. Mass transport resistance for vapor or gas phase resistance is given as the ratio of the gas diffusion path length (the barrier layer thickness) to the gas phase diffusion coefficient, mathematically expressed as $$R_{MT} = \frac{\delta}{D\varepsilon^{1.5}}$$

where $R_{MT}$ is the mass transport resistance, $\delta$ is the thickness of the barrier layer and $D_\varepsilon^{1.5}$ is the effective diffusion coefficient in the barrier matrix. To achieve the same improvement, e.g., in the shelf life, that is obtained by the 50% reduction in porosity, the thickness of the barrier layer should be increased to approximately 2.8 times the unaltered layer.

Various combinations of methods of modifying the mass transport resistance of barrier layer 34 can be used. That is, the selected areas can be modified by mechanical methods, chemical methods, and/or any of the methods described herein. For example, selected areas can be modified by using multiple layers of barrier layer 34 that is coated with material that increases mass transport resistance, or the areas can be modified by mechanical work and chemical methods.

Various areas of cells 104 can be modified. The areas to be modified are generally selected to maximize cell performance by maximizing uniform utilization of active materials and minimizing water loss. The modified areas can include the entire top surface of cells 104 or selected portions of the top surface. Along selected areas, e.g., the top surface, the degree of modification can be varied. For example, the mass transport resistance can be graded from one side of cell to the other side of the cell, e.g., in which the mass transport resistance is at a minimum at the middle of the top surface but at a maximum at near the sides. The sides and/or bottom of cells 104 can be modified as described herein.

In other embodiments, modification of the barrier layer as described herein can be applied to systems other than cells 104, such as other battery systems. In general, the barrier layer of any electrochemical power sources can be modified.

The power sources can be non-hermetically sealed. The power sources can include metal-air batteries (such as zinc-air batteries, aluminum-air batteries, and magnesium-air batteries), air recovery batteries, and air depolarized cells. Examples of these power sources are described in U.S. Patent Nos. 2,597,119; 3,436,270; U.S. Ser. No. 09/494,586, filed Jan. 31, 2000, now U.S. Pat. No., 6,432,438; and U.S. Ser .No. 09/544,076, filed Apr. 6, 2000, now U.S. Pat. No. 6,399,243, all hereby incorporated by reference. The power sources can be those that include non-circular air access openings, such as slits, slots and louvers, as described in U.S. Pat. No. 6,232, 007; and U.S. Ser .No. 09/773,962, filed Feb. 1, 2001, and entitled "Battery", now abandoned, all hereby incorporated by reference. The power sources can be a fuel cell.

The modification of the barrier layer can be applied to electrochemical power sources of various configurations. For example, the power sources can be a cylindrical cell, button cell, a prismatic cell of any cross section, or a racetrack-shaped cell.

For non-hermetically sealed electrochemical power sources, the surface area or volume of portion(s) of the barrier layer that are modified can vary. The modified portions can be adjacent to air access openings on the power sources, e.g., aligned with openings in a cell can. The area of a modified portion can be equal to the area of an air access opening, or the areas can be different. For example, relative to the area of an air access opening, the area of a modified portion of a barrier layer can be greater by two times, four times, six times, eight times, sixteen times, thirty-two times, or sixty-four times. In other embodiments, relative to the area of a modified portion of the barrier layer, the area of the air access opening can be greater by two times, four times, six times, eight times, sixteen times, thirty-two times, or sixty-four times. The areas can be substantially aligned or misaligned.

The barrier layer can be modified as described herein, e.g., by using mechanical and/or chemical methods, and/or by changing the thickness of the barrier layer. In some embodiments, the barrier layer can be modified after the power source has been assembled. For example, the barrier layer can be mechanically worked by thumping or depressing an exterior portion of a battery can, which can spring back to position after thumping.

In other embodiments, the degree that portions of a barrier layer are modified can vary. Some modified portions may have different porosity, density, and/or mass transport resistance than other modified portions. Modification of a barrier layer described herein, including as methods, degrees and locations of modified areas, can also be applied to a separator layer between a cathode and an anode, e.g., to affect water and/or electrolyte diffusion, and/or to the absorbent layer with a hydrophobic vapor barrier described above. In other embodiments, instead of or in addition, to modifying certain areas to increase their mass transport resistance, other areas can be modified to relatively decrease their mass transport resistance, e.g., by using a thinner or less porous or less dense portions of barrier layer or separator.

Air Access Opening Design

As discussed above, at the pack level, the mass transport resistance of cartridge 100, e.g., to oxygen, is in part a function of the pattern of the air access holes 112, e.g., their placement and/or area. The size and/or the location of the holes are preferably designed to maximize oxygen transport while minimizing water transport. Also, the oxygen flux across the cathode in the pack should be uniform to maximize the utilization of active materials. For example, if there are too many holes or if the holes are placed in less preferred positions, the ingress or egress of water from the pack can cause premature failure. If there are not enough holes positioned at preferred locations to supply sufficient oxygen, the pack may not be able to provide the, required current for a given application.

Using finite element modeling of gas transport, including variables such as the number of holes and the locations of the holes, certain patterns or designs of air holes are calculated to result in a decrease in the rate of the water ingress into or egress from the cell, while providing sufficient oxygen transport for a selected application. For a three-cell telecommunications pack, for example, a design in which the air holes are placed between the cells, e.g., in the gap between the cells, results in a reduction of water transport by a factor of 3, while at the same time maintaining the requisite oxygen concentration, e.g., for the CDMA or the GSM rate.

Model simulations revealed that, in packs 100, most of the water transport was from the cathode directly underneath the air access holes. As holes are added directly over the cells, water transport continues to increase. It is believed that the mechanism for water vapor transport is diffusion, so concentration gradient is the driving force. Here, the major concentration gradient is at the top of the cells, so water transport occurs across the top of the cells. In comparison, the concentration gradients at the sides and bottom of the cells are relatively small, so the driving force for water transport across the sides and bottom is relatively small. Thus, forming holes directly over cells 104 markedly increases the rate of water transport. In some circumstances, removing the holes that are directly above the top of the cells and using only those that are above the cell gaps reduced the rate of water loss/gain from the cells by approximately 60%.

Furthermore, while the oxygen partial pressure was the highest directly below the holes, forming holes directly over cells 100 did not markedly enhance oxygen access. Oxygen access to bottom of the cells was also not enhanced by placing holes directly over the cells. Indeed, in certain circumstances, removing holes from directly the top of cells did not affect oxygen transport by much, e.g., less than about 1-2%. Thus, it is believed that holes placed over cell gaps in pack 100 can alone provide uniform and requisite oxygen distribution, for example, at GSM and/or CDMA rates, while water flux is minimized.

The diameter of the air access holes can also be designed to affect the performance of pack 100 or an electrochemical cell, e.g., a metal-air cell (Example 3). In embodiments, as the hole diameter increases, the limiting current increases and the shelf-life decreases. The limiting current can increase relatively more than the decrease in shelf life. Increasing the hole diameter can also decrease the ratio of maximum current density to minimum current density (Max/Min ratio), and the standard deviation of the reaction current density. It is believed that the Max/Min ratio is an indicator of uniformity of flooding or wetting, and the standard deviation is an indicator of anode utilization. That is, decreasing the hole size deteriorates the standard deviation and the Max/Min ratio, and adversely affects utilization and wetting. Thus, decreasing the hole size appears to have the same effect as modifying the barrier layer as described above, in terms of decreasing limiting current and increasing shelf-life. Accordingly, in some embodiments, design of the air access holes can be used in combination with the modified barrier layer described above. For example, thumped Teflon can be used for the top sides of the cells to further reduce water flux in addition to designing the air access holes only in the cell gaps. By using thumped Teflon directly underneath the air access holes, improvements can be achieved in reducing the non-uniformity in current density and improving the shelf life of the packs.

The examples given below provide some methods for designing the air access openings. In some embodiments, the openings are preferably placed over the gap between adjacent cells. Rows of openings can be positioned such that they are centered over a sidewall of a cell. The openings can be off-centered from the sidewall of a cell. For example, only a portion, e.g.; 10%, 20%, 30%, 40%, 60%,.70%, 80%, or 90%, of each opening is over a sidewall of a cell. In some embodiments, no air access openings are directly and/or completely over the cells. The row(s) can be completely and/or directly over the gap between adjacent cells. The number of adjacent rows of openings near the gap can vary, e.g., 1, 2, 3, 4, 5 or greater. Adjacent rows are preferably evenly spaced, but they can be unevenly spaced. The spacing between adjacent openings can be even or uneven. Openings can be non-circular, e.g., oval, elongated, and/or slits.

Metal-air Cell

Referring to FIGS. 6-11, a metal-air cell 104 includes a cathode assembly 22, a bottom end member 24 connected to an end of assembly 22, and a top end member 26 connected to another end of assembly 22. Cathode assembly 22 includes a cathode 28 formed on a current collector 30, a separator 32 glued to an interior side of cathode 28, and a barrier layer 34 wrapped around, e.g., laminated to, an exterior side of cathode 28. Cathode assembly 22 is, formed to define a cavity 36. Cell 104 further includes an anode 38 and an anode current collector 40 disposed in cavity 36. Anode current collector 40 extends from bottom end member 24, through cavity 36, and through top end member 26. A negative tab 42 is connected to anode current collector 40, and a positive tab 44 is connected to cathode current collector 30. When cell 104 is fully assembled (FIG. 1), barrier layer 34 defines an exterior surface of the battery.

Cathode assembly 22 includes cathode 28 formed on current collector 30, separator 32, and barrier layer 34.

Cathode 28 includes an active cathode mixture having a catalyst for reducing peroxide, such as a manganese compound, carbon particles, and a binder. Useful catalysts include manganese oxides, such as $Mn_2O_3$, $Mn_3O_4$, and $MnO_2$, that can be prepared, for example, by heating manganese nitrate or by reducing potassium permanganate. Cathode 28 includes between about 1% and about 10%, preferably between about 3% and about 5% of catalyst by weight.

The carbon particles are not limited to any particular type of carbon. Examples of carbon include Black Pearls 2000, Vulcan XC-72 (Cabot Corp., Billerica, Mass.), Shawinigan Black (Chevron, San Francisco, Calif.), Printex, Ketjen Black (Akzo Nobel, Chicago, Ill.), and Calgon PWA (Calgon Carbon, Pittsburgh, Pa.). Generally, the cathode mixture includes between about 30% and about 70%, preferably between about 50% and about 60%, of total carbon by weight.

Examples of binders include polyethylene powders, polyacrylamides, Portland cement and fluorocarbon resins, such as polyvinylidene fluoride and polytetrafluoroethylene. An example of a polyethylene binder is sold under the tradename Coathylene HA-1681 (Hoechst). A preferred binder includes polytetrafluoroethylene (PTFE) particles. Generally, the cathode mixture includes between about 10% and 40%, preferably between about 30% and about 40%, of binder by weight.

The cathode mixture is formed by blending the catalyst, carbon particles and binder, and is then coated on cathode current collector 30, such as a metal mesh screen, to form cathode 28. After the cathode mixture has hardened, cathode 28 is heated to remove any residual volatiles.

On the interior side of cathode assembly 22, separator 32 is glued to cathode 28. Separator 32 can be a porous, electrically insulating polymer, such as polypropylene, that allows electrolyte (described below) to contact cathode 28.

On the exterior side of cathode assembly 22, barrier layer 34 is laminated to cathode 28 to complete cathode assembly 22. Barrier layer 34 is air-permeable and liquid-impermeable. Layer 34, e.g., a PTFE membrane, helps maintain a consistent humidity level in cell 104. Layer 34 also helps to prevent the electrolyte from leaking out of the battery and $CO_2$ from leaking into the cell.

Anode gel 38 contains a mixture of zinc and electrolyte. The mixture of zinc and electrolyte can include a gelling agent that can help prevent leakage of the electrolyte from the cell and helps suspend the particles of zinc within the anode.

The zinc material can be a zinc powder that is alloyed with lead, indium, aluminum, or bismuth. For example, the zinc can be alloyed with between about 400 and 600 ppm (e.g., 500 ppm) of lead, between 400 and 600 ppm (e.g., 500 ppm) of indium, or between about 50 and 90 ppm (e.g., 70 ppm) aluminum. Preferably, the zinc material can include lead, indium and aluminum, lead and indium, or lead and bismuth. Alternatively, the zinc can include lead without another metal additive. The zinc material can be air blown or spun zinc. Suitable zinc particles are described, for example, in U.S. Ser. No. 09/156,915, filed Sep. 18, 1998, now U.S. Pat. No. 6,521,378, U.S. Ser. No. 08/905,254, filed Aug. 1, 1997, now U.S. Pat. No. 6,284,410, and U.S. Ser. No. 09/115,867, filed Jul. 15, 1998, now abandoned, each of which is incorporated by reference in its entirety.

The, particles of the zinc can be, spherical or nonspherical. For example, the zinc particles can be acicular in shape (having an aspect ratio of at least two). The zinc material includes a majority of particles having sizes between 60 mesh and 325 mesh. For example, the zinc material can have the following particle size distribution:

0-3 wt % on 60 mesh screen;
40-60 on 100 mesh screen;
30-50 wt % on 20.0 mesh screen;
0-3 wt % on 325 mesh screen; and
0-0.5 wt % on pan.

Suitable zinc materials include zinc available from Union Miniere (Overpelt, Belgium), Duracell (USA), Noranda (USA), Grillo (Germany), or Toho Zinc (Japan).

The gelling agent is an absorbent polyacrylate. The absorbent polyacrylate has an absorbency envelope, of less than about 30 grams of saline per gram of gelling agent, measured as described in U.S. Pat. No. 4,541,871, incorporated herein by reference. The anode gel includes less than 1 percent of the gelling agent by dry weight of zinc in the anode mixture. Preferably the gelling agent content is between about 0.2 and 0.8 percent by weight, more preferably between about 0.3 and 0.6 percent by weight, and most preferably about 0.33 percent by weight. The absorbent polyacrylate can be a sodium polyacrylate made by suspension polymerization. Suitable sodium polyacrylates have an average particle size between about 105 and 180 microns and a pH of about 7.5. Suitable gelling agents are described, for example, in U.S. Pat. NOS. 4,541,871, 4,590,227, or 4,507,438.

In certain embodiments, the anode gel can include a non-ionic surfactant. The surfactant can be a non-ionic phosphate surfactant, such as a non-ionic alkyl phosphate or a non-ionic aryl phosphate (e.g., RA600 or RM510, available from Rohm & Haas) coated on a zinc surface. The anode gel can include between about 20 and 100 ppm of the surfactant coated onto the surface of the zinc material. The surfactant can serve as a gassing inhibitor.

The electrolyte can be an aqueous solution of potassium hydroxide. The electrolyte can include between about 30 and 40 percent, preferably between 35 and 40 of potassium hydroxide. The electrolyte can also include between about 1 and 2 percent of zinc oxide.

End members 24 and 26 are made of electrically-insulating materials, such as acrylonitrile-butadiene-styrene (ABS). Each member 24 and 26 includes an opening sized to receive anode current collector 40. Both end members 24 and 26 also include steps 45 and 49, respectively, to help align cathode assembly 22 with the end members, as described below. Furthermore, top end member 26 also defines a notch 47 through which positive tab 44 extends (FIG. 6).

Anode current collector 40, positive tab 44, and negative tab 42 are made of materials that are stable to chemicals and electrical potentials present in cell 104. For example, anode current collector is made of brass; positive tab 44 is made of nickel metal; and negative tab 42 is made of tin-plated brass.

To assemble cell 104, a blank, such as a rectangular sheet, of desired dimensions is punched or cut from a larger sheet of cathode assembly 22 (made of cathode 28, current collector 30, separator 32, and barrier layer 34). With portions of barrier layer 34 and separator 32 temporality peeled back sufficiently, cathode material 28 is removed (e.g., by scraping) from both sides of opposing edges of cathode assembly 22 to expose two areas of current collector 30. These exposed areas will be welded together after cathode assembly 22 is shaped. Cathode assembly 22 is then shaped to define cavity 36 and to overlap the exposed areas of current collector 30 together. For example, the cathode assembly can be folded to form a cathode tube with a rectangular or square cross section, or can be bent or curled around a mandrel to form a cathode tube with a circular cross section. The exposed areas of current collector 30 are overlapped and welded together to provide a relatively rigid tube of cathode assembly 22. Parts of separator 32 that were temporarily peeled back are repositioned over a seam produced by welding, overlapped and secured with a few drops of epoxy to separate cathode 28 and anode 38.

Positive tab 44 is then welded to current collector 30 on the exterior side of cathode assembly 22 along the seam. A strip of sealant 46, such as an epoxy (available from 3M, St. Paul, Minn.), is then applied over positive tab 44 and the seam, along the length of cathode assembly 22 to minimize electrolyte and anode 38 from leaking from cell 104.

Anode current collector 40 is inserted through the opening in bottom end member 24. Epoxy 48 is applied to on the exterior side of the opening of bottom end member 24 to secure anode current collector 40 to the bottom end member and to minimize electrolyte and anode 38 from leaking through the opening.

Bottom end member 24 is then connected to cathode assembly 22 by inserting anode current collector 40 into cavity 36, and mating the cathode assembly with the bottom end member. Step 45 helps to center cathode assembly 22 on bottom end member 24. A bead of epoxy 50 extending around cathode assembly 22 secures the cathode assembly to bottom end member 24 and minimizes leaks from cell 104. In some embodiments, bottom end member 24 can include a groove in which cathode assembly 22 can sit, and bead of epoxy 50 can be deposited in the groove.

Cavity 36 is then filled with anode 38.

A layer of epoxy 56 is applied to the interior surface of top end member 26 to minimize leaks from cell 104. Top end member 26 is then placed on cathode assembly 22 such that notch 47 receives positive tab 44 and anode current collector 40 extends through the opening in the top end member. Step 49 helps to center cathode assembly 22 on top end member 26. By extending anode current collector 40 through both end members 24 and 26, the anode current collector acts as a rigid support that enhances the mechanical integrity of cell 104. Also, an anode current collector that extends along the length of cell 104 can also optimize the efficiency of discharge by providing a relatively small voltage drop. A bead of epoxy 52 is applied to top end member 26, around cathode assembly 22, similar to epoxy 48. Epoxy 54 is also applied to the exterior side of the opening of top end member 26 to secure anode current collector 40 to the top end member and to minimize electrolyte and anode 38 from leaking through the opening.

Negative tab 42 is then welded to anode current collector 40 to complete assembly of cell 104.

Figure 10:
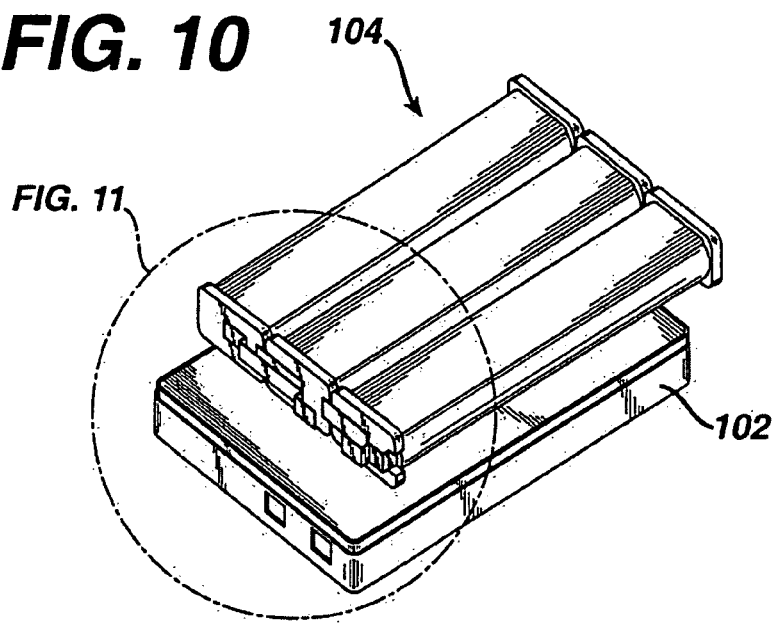
FIG. 10 is a partial perspective view of an embodiment of a cell system.
Figure 11:
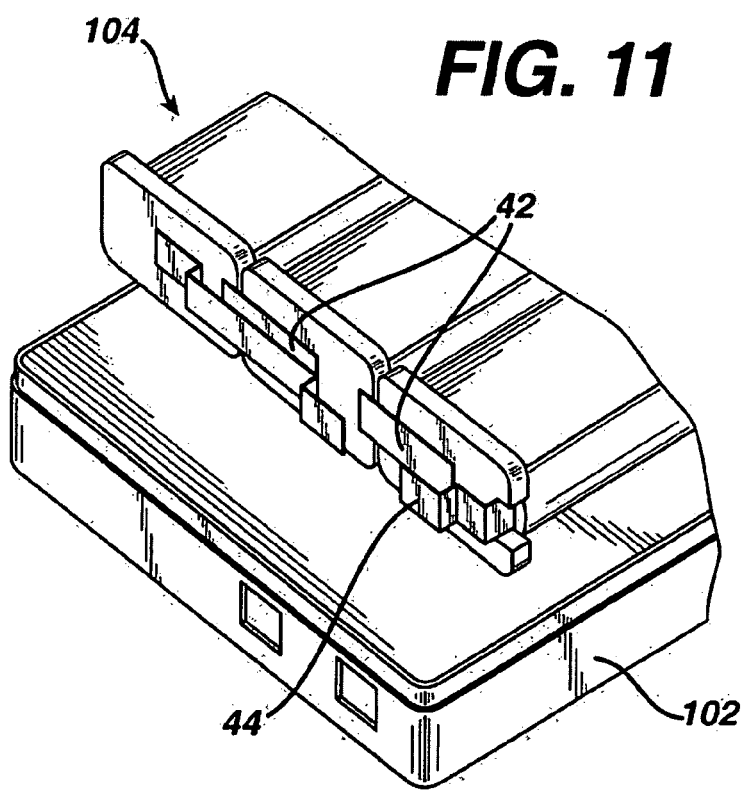
FIG. 11 is a detailed view of the cell system of FIG. 10.

Cells 104 are placed in pack 100 with their negative and positive tabs appropriately connected, e.g., in series (FIGS. 10 and 11).

Numerous other combinations of steps can be used to assemble cell 104. For example, anode current collector 40 can be glued to top end member 26 and welded to negative tab 42, and this assembly can be connected as one unit to cathode assembly 22. Bottom end member 24 may not include an opening. Anode current collector 40 may extend only a portion of the length of battery 20. Tabs 42 and 44 may extend from cell 104 to opposite ends of the battery. Cell 104 may not include a negative tab. End members 24 and 26 and/or cathode assembly 22 l may have different cross section shapes, such as triangular, circular, square, and rectangular. Cell 104 can be formed in numerous sizes, such as, for example, to fit inside and to be used with a metal-air cartridge as described in commonly-assigned U.S. Ser .No. 09/693,010, now U.S. Pat. No. 6,384,574.

In other embodiments, separator 32 and barrier layer 34 can be disposed adjacent to cathode 28 by other means. For example, separator 32 can be cast from solution and be formed on cathode 28 when the solution dries.

The following examples are illustrative and not intended to be limiting.

EXAMPLE 1

Applying finite element modeling generally includes solving equations (given below) for a specified geometry of a system. The solution procedure generally includes entering the geometry into FEMLAB/MATLAB software, entering the equations at each boundary in the geometry, and solving the equations using the built-in algorithm for Finite Element solver in the software. The plenum is divided into a mesh of between 3,000 and 19,000 elements.

The governing equations include:

Mass conservation (bulk): $\nabla \cdot v = 0$

Mass conservation (species): $\rho v \cdot \nabla X_m + \nabla \cdot (-D\rho \nabla X_m) = 0$ Momentum conservation: $\rho v \cdot \nabla v_x + \nabla \cdot (-\mu \nabla v_x) + \delta p/\delta x = 0$ where v=velocity; ρ=density; and X=mass fraction. The boundary conditions cover the air access holes, the walls, and the cathode. For the air access holes, ρ, $X_m$, and p are all ambient. Velocity (v) is proportional to applied current. For the walls, normal fluxes are zero (bulk mass, species, momentum). For the cathode, $n \cdot (-D\rho \nabla X_m)$ is proportional to j, the current density. Current density (j) is proportional to $\rho X_m$.

The oxygen concentration, [$O_2$], is solved for [$O_2$]=$\rho X_m$, normalized to ambient.

EXAMPLE 2

Figure 15:
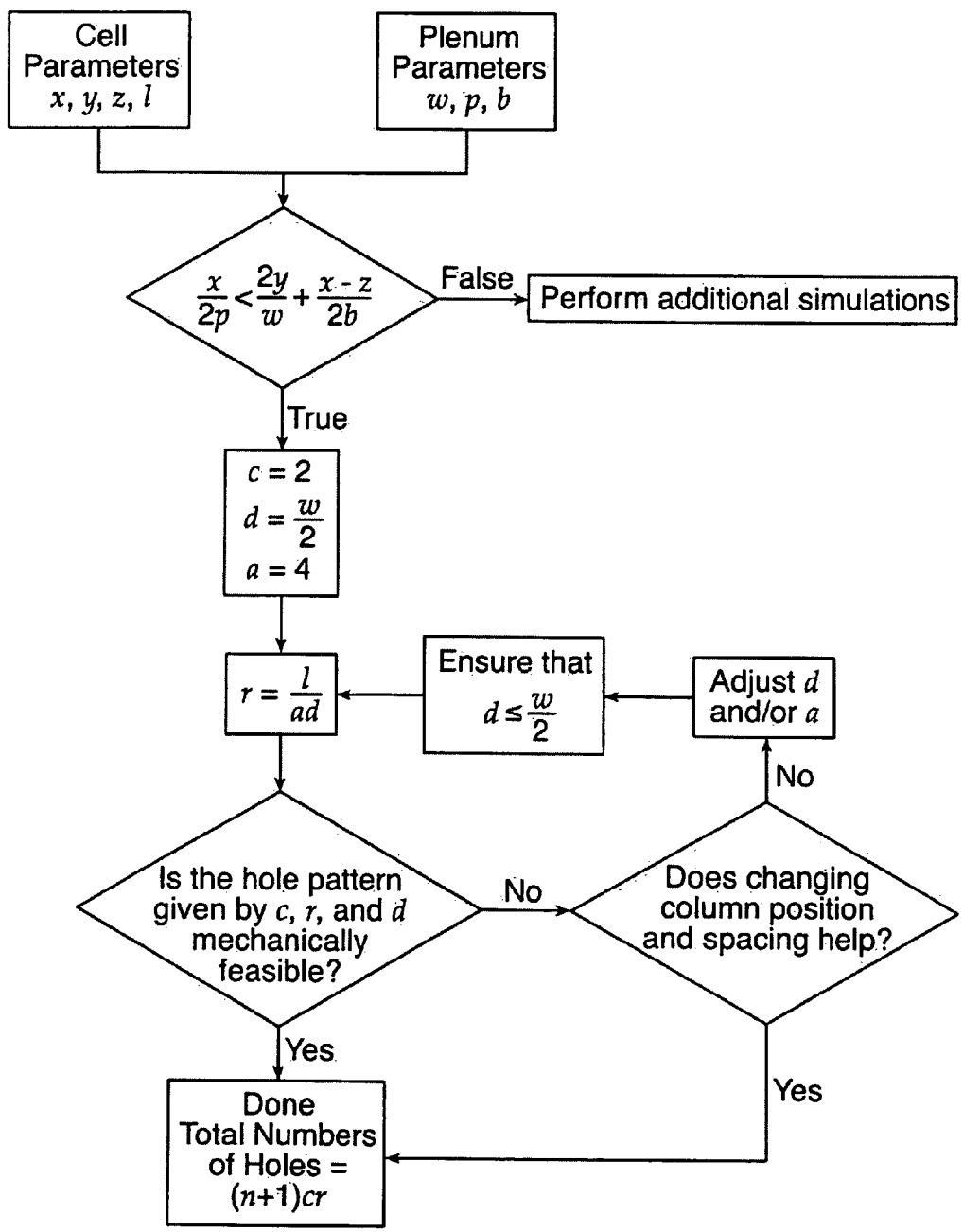
FIG. 15 is a flow chart of an embodiment of a method for designing air access openings.

This example condenses 3-D finite element modeling results to an empirical algorithm that contains a set of empirical equations and conditions. The algorithm can provide a general framework that aids in the finding of a preferred air hole access design, such as to obtain a preferred number of holes and their placement during design of a battery cartridge or pack. The algorithm is valid for any arbitrary prismatic pack design. The algorithm also presents a method to account for mechanical constraints that may arise during the design of the packs. This approach can result in time savings and independence from running finite element simulations every time a change is made in the design. FIG. 15 shows a flowchart summarizing the algorithm for design and the conditions under which it is valid.

Figure 12:
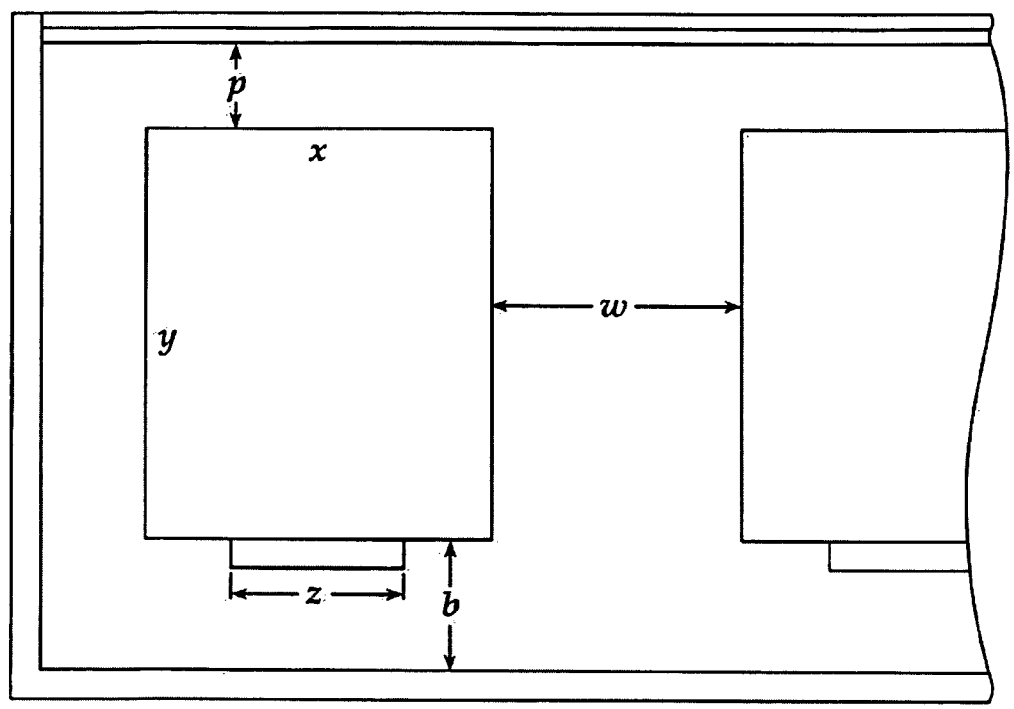
FIG. 12 is a schematic diagram of a cross section of an embodiment of a cell pack.
Figure 13:
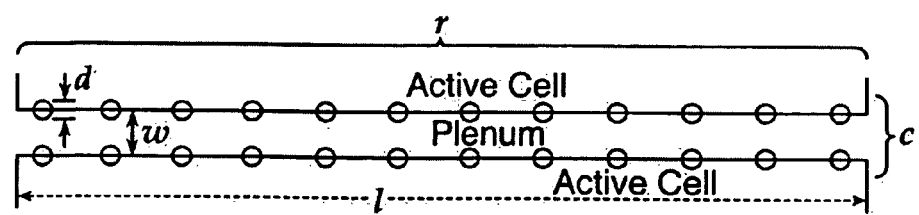
FIG. 13 is a schematic diagram of a portion of the cell pack of FIG. 12.

The algorithm is general and can be used for any cell-pack with n prismatic canless cells. Referring to, FIGS. 12 and 13, the cell parameters are: the cell width (x); the cell, height (y); the tab width (z); and the active cell length (l). The plenum parameters are: the inter-cell plenum width (w); the plenum depth on the top (p); and the plenum depth on the bottom (b). The hole pattern parameters are: the hole diameter (d); the number of columns over each inter-ell plenum (c); and the number of rows of holes (r). The algorithm can be used to determine d, c and r using input parameters x, y, z, l, w, p and b, for example, required to sustain a CDMA or a GSM rate in metal-air packs. The total number of holes is rc(n+1).

Generally, the lowest oxygen concentrations are at the bottom of the cell since this is the longest diffusion path length (from the air access holes to the bottom of the cells). Therefore, the tabbed side of each cell, which is relatively electrochemically inactive, is preferably placed at the bottom of the cartridge to provide an increase in the average oxygen concentration at the other cathode surfaces.

Finite element analysis indicates that the openings are preferably placed over the plenum between the cells, e.g., not directly over the cells. Such placement minimizes the difference between the resistances to diffusion from the openings to the top and to the sides and/or bottom of the cells, so long as the resistance is greater for diffusion to the bottom than to the top. This condition can be formulized as follows:

$$\frac{x}{2p} < \frac{2y}{w} + \frac{x-z}{2b} \quad (1)$$

Thus, in a pack design for which inequality (1) holds, the openings are preferably placed over the inter-cell plenum. If mechanical considerations preclude the placement of openings over the plenum between the end cell and the pack wall, then openings may be placed over the end cell, as close as possible to the plenum. Except for the end cells, placement of openings directly over cells can exacerbate water loss without significantly improving air access.

In some embodiments, a mechanical constraint is set such that when the pack is closed, the center-to-center distance between corresponding circular holes in each sheet is approximately twice the hole diameter. Since the distance from hole to hole between sheets is 2d, the distance from hole to hole within a sheet should be 4d in the: lengthwise direction. Also, if multiple columns of holes are used over each inter-cell plenum (i.e., c>1), the center-to-center distance between columns should be 2d.

A hole pattern based solely on maximizing the inter-cell open area would have a single column, of large holes (i.e., c=1) over each plenum, so as to make more efficient the space between columns. In such a design, d would be equal to the inter-cell width, w. Therefore, the lengthwise center-to-center distance would be at least 4w. However, simulations have shown that the farther apart the openings are in the lengthwise direction, the worse the oxygen access is to points, farthest from the openings. In particular, 4w can be too far, so a compromise is preferred between the amount of open area and its distribution in the lengthwise direction.

Figure 14:
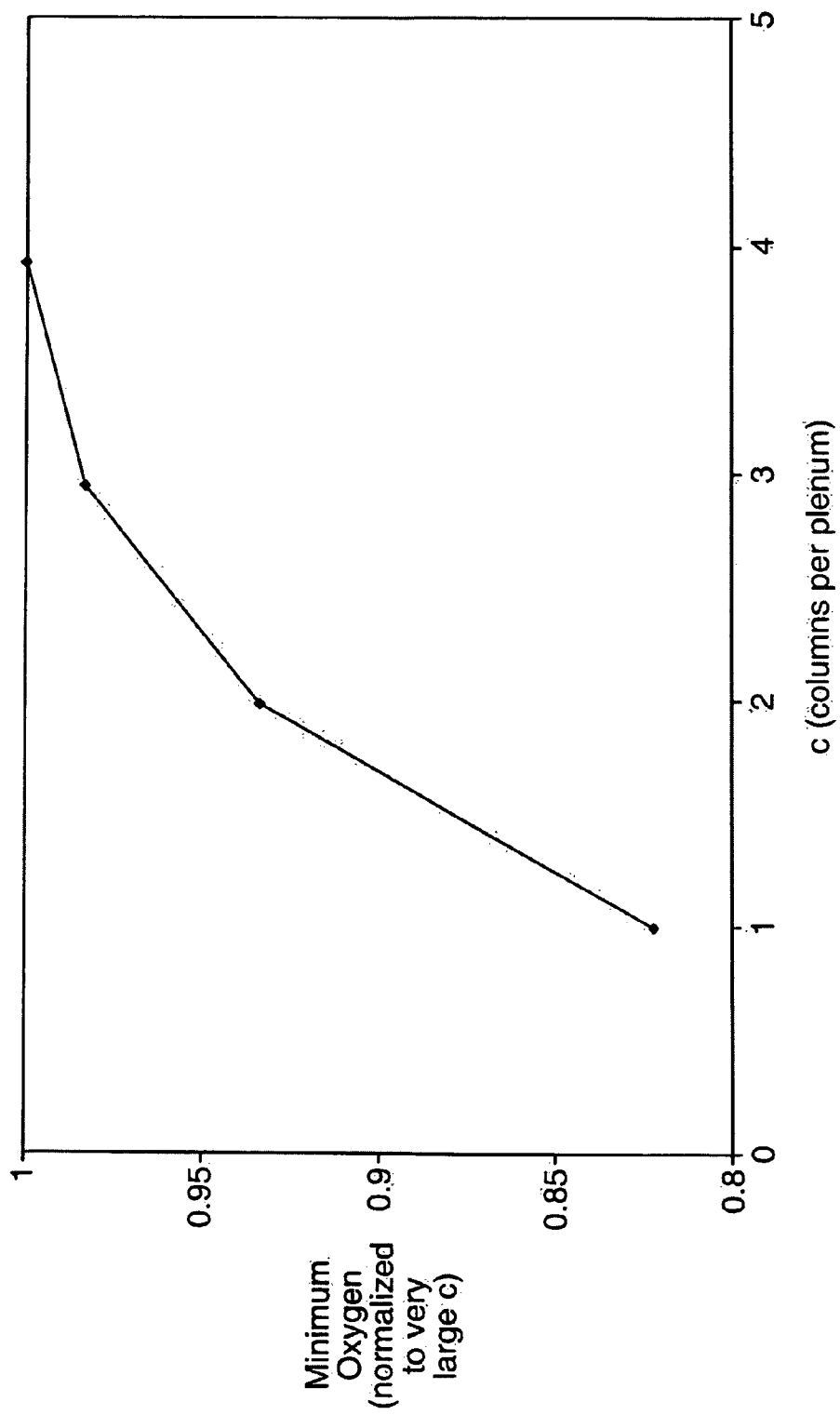
FIG. 14 is a plot of oxygen concentration as a function of number of columns per plenum.

Referring to FIG. 14, the minimum normalized oxygen concentration generally increases with an increase in c. The increase in the concentration with an increase in c from 1 to 2 is approximately 15% of the c=1 value. With an increase in c from 2 to 3 and 4 the increase in the minimum concentration is approximately 4% of the c=2 value. Therefore, the benefit from increasing c from 1 to 2 is significant and the benefit decreases when c is increased beyond 2. From both a manufacturing standpoint and a seal leakage standpoint, there can be higher cost and higher chance of failure as more holes are formed. Thus, c=2 represents a preferred number of columns over each inter-cell plenum. Simulations have shown that the c=2 preference is independent of the plenum width, w.

Finite element analysis has also demonstrated that the two columns should be centered over the cell/plenum interfaces. In this case, with the constraint that the center-to-center distance between columns is at least 2d, the hole diameter preferably obeys the following inequality:

$$d \leq \frac{w}{2} \quad (2)$$

It is not evident a priori whether d should in fact be equal to or less w/2. If d=w/2, then the center-to-center distance between columns is equal to 2d and the open area is maximized. However, the lengthwise distance between holes, 4d, is also maximized. Simulations have shown that for a given c, the benefits gained by maximizing the open area slightly outweigh detriments from unpreferred lengthwise distribution. Thus, the preferred diameter is given as:

$$d = \frac{w}{2} \quad (3)$$

If the center-to-center distance between holes in a column is ad, where a is approximately four, then the number of rows of holes is given by:

$$r = \frac{l}{ad} \quad (4)$$

where l is the active cell length. Equations 3 and 4 along with c=2, can be used to determine a preferred hole pattern for a given w.

If in designing a hole pattern for a given pack design, the pattern of holes given by these formulas is not mechanically feasible, then some modifications can be made to the pattern. Simulations have shown that the positions of the columns in the widthwise direction, the distance between them, the hole diameter (d), and/or the parameter (a) may be adjusted. In adjusting d and a, it is preferable to satisfy Equation 4 (that is, r is preferably changed accordingly), but Inequality 2 may be substituted for Equation 3. If a feasible hole pattern cannot be obtained by making small changes in these four parameters, then choosing a different value of c may help.

When new packs are designed, the above process can be used to predict a preferred hole pattern rather than iteratively simulating changes to old hole patterns. The process is shown in FIG. 15. The preferred number of columns (c) over each inter-cell plenum is set at two, and Equations 3 and 4 are used to determine the preferred values of the hole diameter (d) and the number of rows (r). If the hole pattern given by d, c, and t is feasible, then it can be used. If not, adjustment may be used as described above to design a feasible hole pattern. If possible, the same size, number, and pattern of holes is preferably placed over each end cell as over each inter-cell plenum, and the holes over each end-cell is preferably as close as possible to the pack wall. Hole patterns designed according to this process can maximize air access and minimize water loss while substantially maintaining the mechanical constraints placed on the cover design.

EXAMPLE 3

This example investigates the use of thumped Teflon in button cells to render the current density in the cathode more uniform and to improve the activated shelf life. Using the finite element gas transport model described above, the effect of thumping an unlaminated Teflon layer in a 9-hole 675 Duracell zinc-air button cell was investigated.

Selective thumping of the unlaminated Teflon disc in button cells can be used to significantly extend the activated shelf life and also improve the uniformity in the current distribution in the cathode. For example, thumping of unlaminated Teflon in circular segments with 4× the diameter of the air access holes directly beneath the holes results in the extension of the shelf life approximately by a factor of 2. Also, the current density is 5-10 percent more uniform. A more uniform current density can result in more uniform flooding and improved anode utilization, both highly desirable for a button cell performance. However, these advantages can be at the cost of reduced limiting current of the cell.

The MEV675 button cell that was evaluated has nine air access holes in the can: eight holes evenly spaced around a circle, and one hole in the center of the circle. Diffusion in a 45° pie slice, containing one of the peripheral holes and one eighth of the center hole, was considered. Diffusion was modeled through a Wattman paper air dispersion disc of porosity 0.5, a Teflon disc of porosity 0.2, and a laminated Teflon layer (on the cathode) also of porosity 0.2. The effect of thumping on the current distribution and the shelf-life were simulated and compared to an unthumped cell.

Figure 16B:
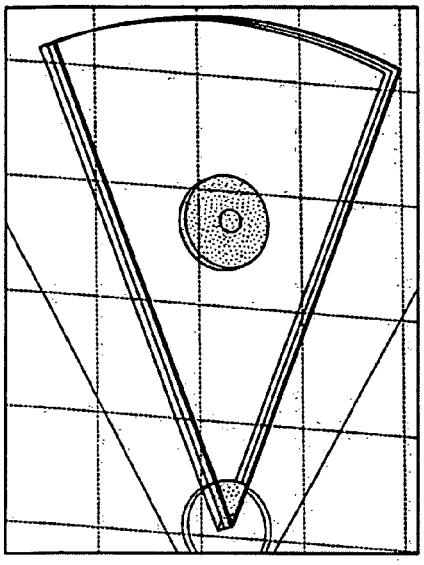
FIGS. 16A, 16B, 16C, and 16D are illustrations of embodiments of simulation patterns of modified barrier layers.
Figure 16D:
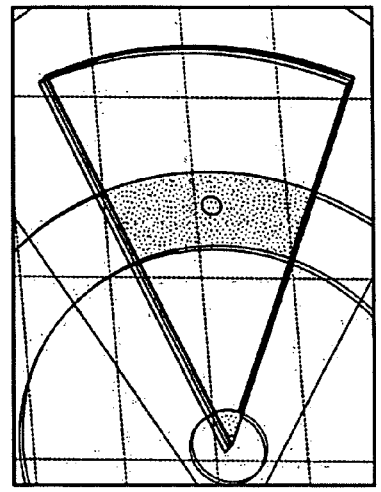
Figure 16A:
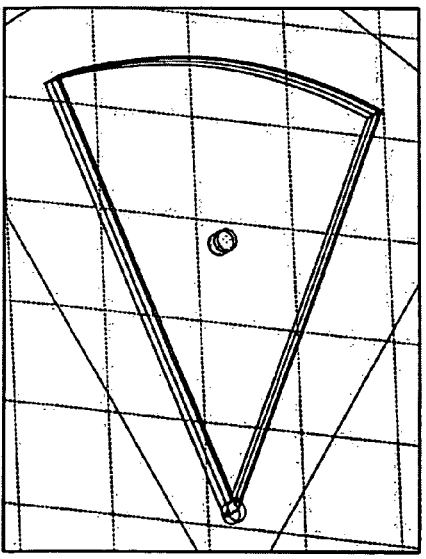
Figure 16C:
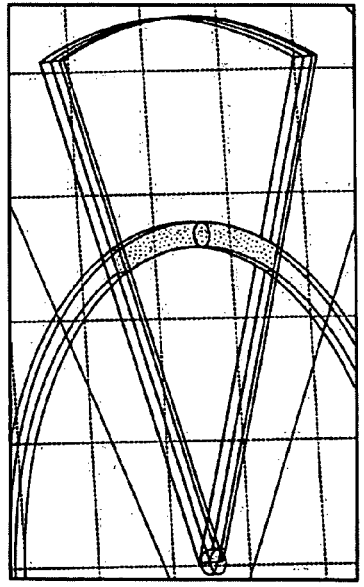

Four different thumping patterns were simulated to get a general sense of how thumping affects oxygen diffusion (FIGS. 16A-16D). Referring to FIG. 16A, in pattern 16A only the area directly under each hole was thumped. Thus, pattern 16A includes nine circular regions, each with a diameter equal to the diameter of the air access holes. Similarly, pattern 16B (FIG. 16B) includes nine circular regions centered under the air access holes, but each thumped region has a diameter four times greater than the diameter of the air access holes. The thumped area in pattern 16B is sixteen times greater than the thumped area in pattern 16A. Patterns 16C and 16D each includes one circular thumped region under the center hole and one ring-shaped, thumped band under the eight peripheral holes (FIGS. 16C and 16D). In pattern 16C, both the diameter of the circular thumped region and the width of the thumped band are equal to the air-access hole diameter. In pattern 16D, both the diameter of the circular thumped region and the width of the thumped band are four times greater than the air-access hole diameter. In some cases, patterns 16A and 16B can be relatively more rational from a current distribution standpoint, whereas patterns 16C and 16D may be more convenient from a manufacturing standpoint. Various final porosities between 0 and 0.2 were simulated for each thumping pattern.

Figure 17:
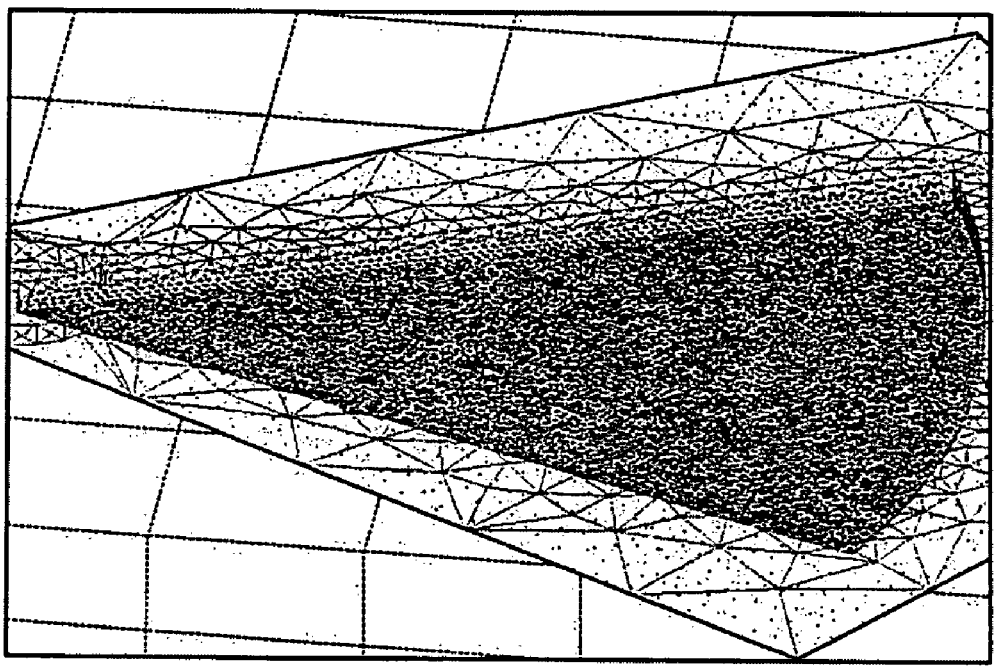
FIG. 17 is a finite element mesh for a 45 degree portion of a button cell.

A 3-D finite element mesh was generated on the three layers using FEMLAB (FIG. 17). The, 3-D steady-state diffusion equation was numerically solved on this mesh for the various thumping patterns, final porosities, and boundary conditions. The effective diffusion coefficient in each subdomain (Wattman Paper, unthumped Teflon, and thumped Teflon) was related to the layer porosity, $\epsilon$, according to the equation $D_{eff} = D\epsilon^{1.5}$. The oxygen concentration at the air-access holes was assumed to be ambient. In simulations used to determine the limiting current, the oxygen concentration at the cathode/laminated Teflon interface was set to zero. The flux was then integrated to determine the limiting current. The limiting current in the unthumped case was also approximated experimentally via a series of galvanostatic discharges. For the unthumped case, the measured value of 30 mA was half the predicted value of 60 mA. It is believed that this discrepancy is due to inaccuracy in the value of the diffusion coefficient, D, and/or the moles of electrons per mole of oxygen, n. Halving either D or n gives an accurate limiting current. Since D and n have equivalent effects for all simulations, either parameter can be halved.

Figure 18A:
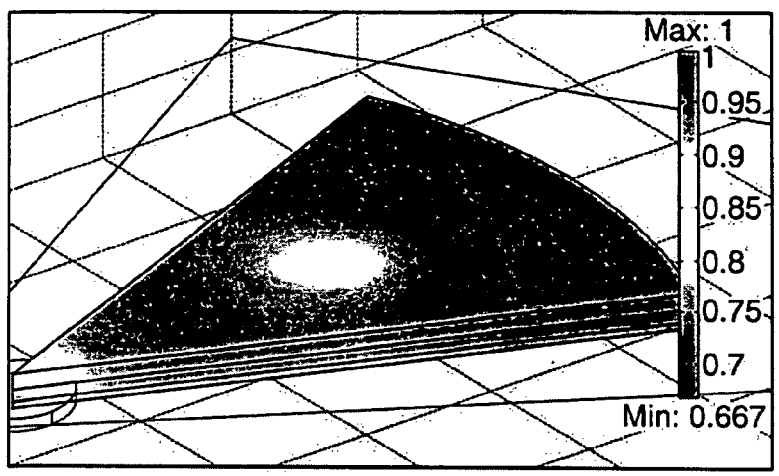
FIGS. 18A and 18B are simulated oxygen distributions at 5 mA applied current for a modified and unmodified barrier layer, respectively.
Figure 18B:
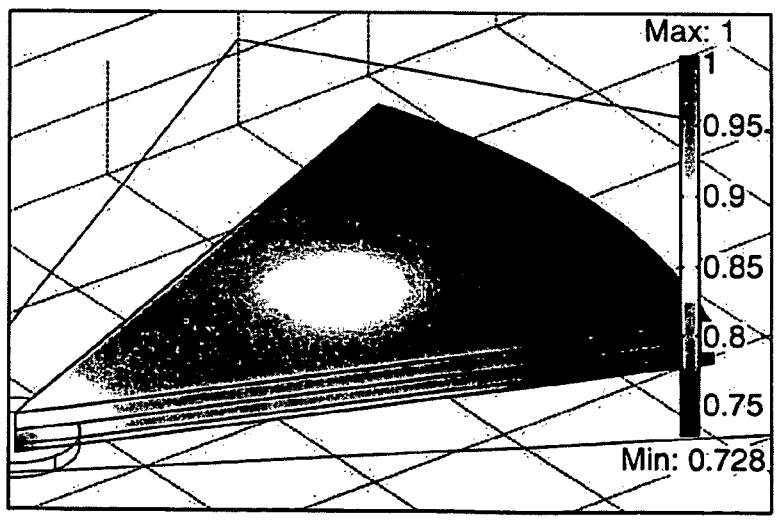

Normalized oxygen partial pressure maps were solved at an applied current of 5 mA (using the experimentally corrected D or n) for several representative thumping patterns. FIGS. 18A and 18B show sample oxygen distributions in the unthumped and thumped cases, respectively. As seen from FIGS. 18A and 18B, the oxygen partial pressure directly below the air access hole decreases with thumping. This results in a decrease in the non-uniformity in the current distribution.

Figure 19:
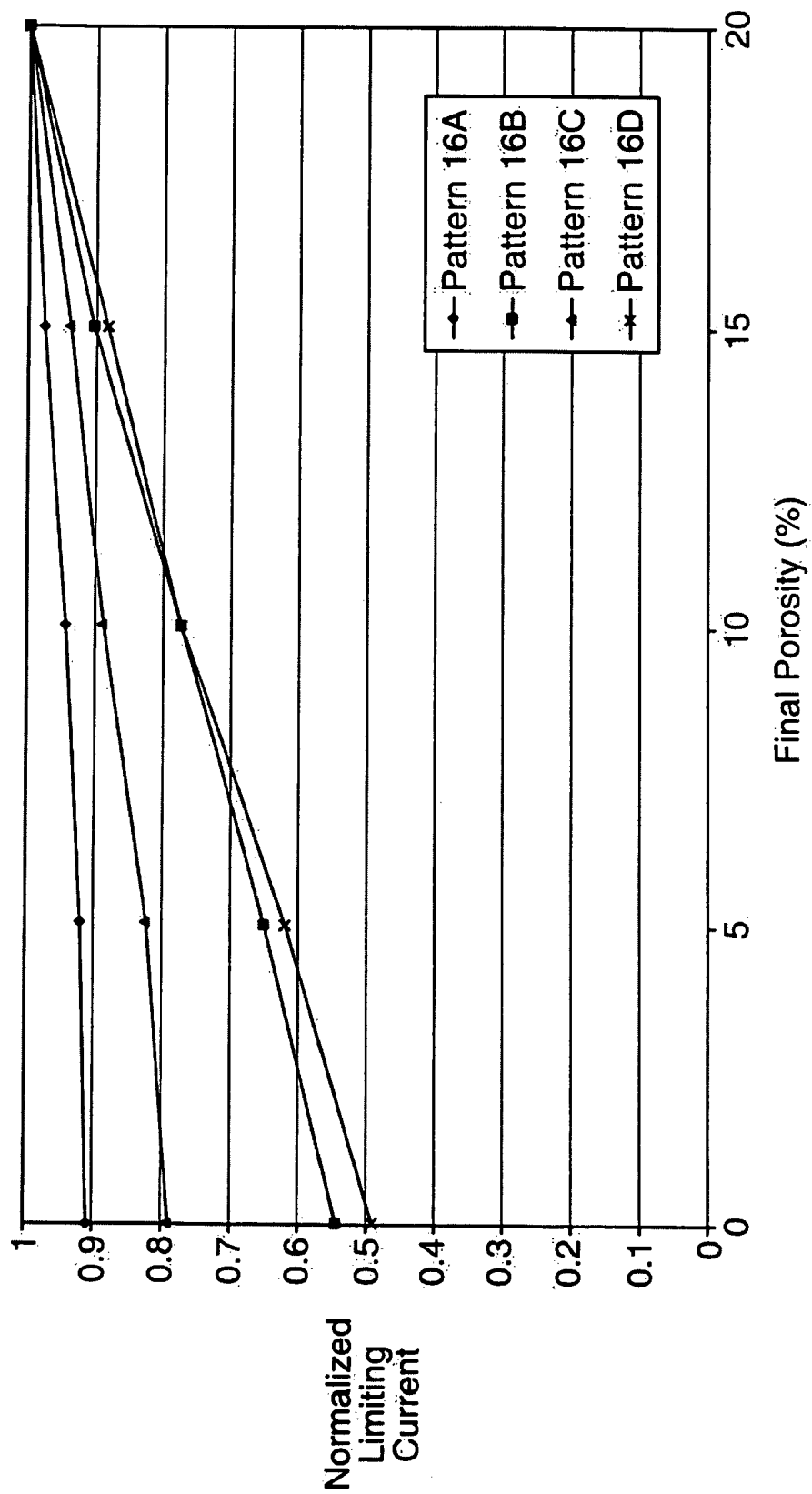
FIG. 19 is a plot of limiting current as a function of final porosity for the patterns of FIGS. 16A-16D.

FIG. 19 shows the effects of thumping on the limiting current. The limiting current, normalized to the unthumped case, is plotted versus final porosity for all four thumping patterns. In each case, the limiting, current decreases almost linearly as porosity is decreased. The patterns with more area thumped show a greater decrease in limiting current. The greatest decrease shown is for pattern 16D, thumped to 0.01% porosity. In this case, the limiting current is half that of the unthumped case.

Figure 20:
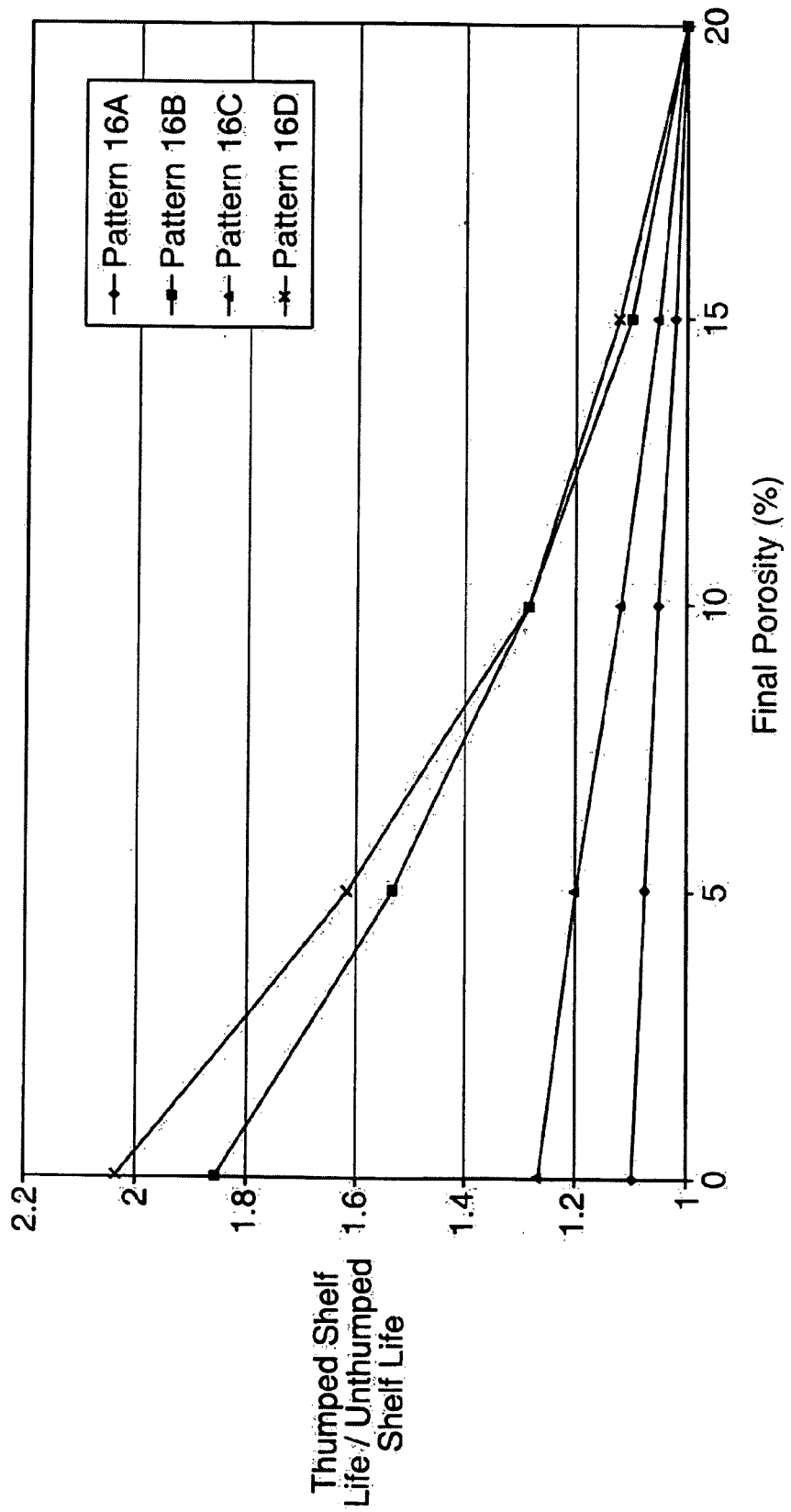
FIG. 20 is a plot of modified shelf life/unmodified shelf life as a function of final porosity for the patterns of FIGS. 16A-16D.

Activated shelf life is inversely proportional to limiting current. Thus, limiting current can be used to predict the effect of thumping on activated shelf life. FIG. 20 shows the ratio of thumped shelf life to unthumped shelf life plotted versus final porosity. The shelf life increases as porosity is decreased. The patterns with more area thumped show a greater increase in activated shelf life. In pattern 16D, thumped to 0.01% porosity, the activated shelf life is twice that of the unthumped case.

Both the standard deviation and the range (minimum and maximum values) of local current density are considered indicators of current distribution uniformity. In a more uniform current distribution, the standard deviation is relatively low and the range is relatively narrow. The standard deviation of current density was roughly the same for all cases considered, with no significant trends observed. The minimum local current density at an applied current of 5 mA was also the same for all cases considered. However, significant variation was observed in the maximum local current density.

Figure 21:
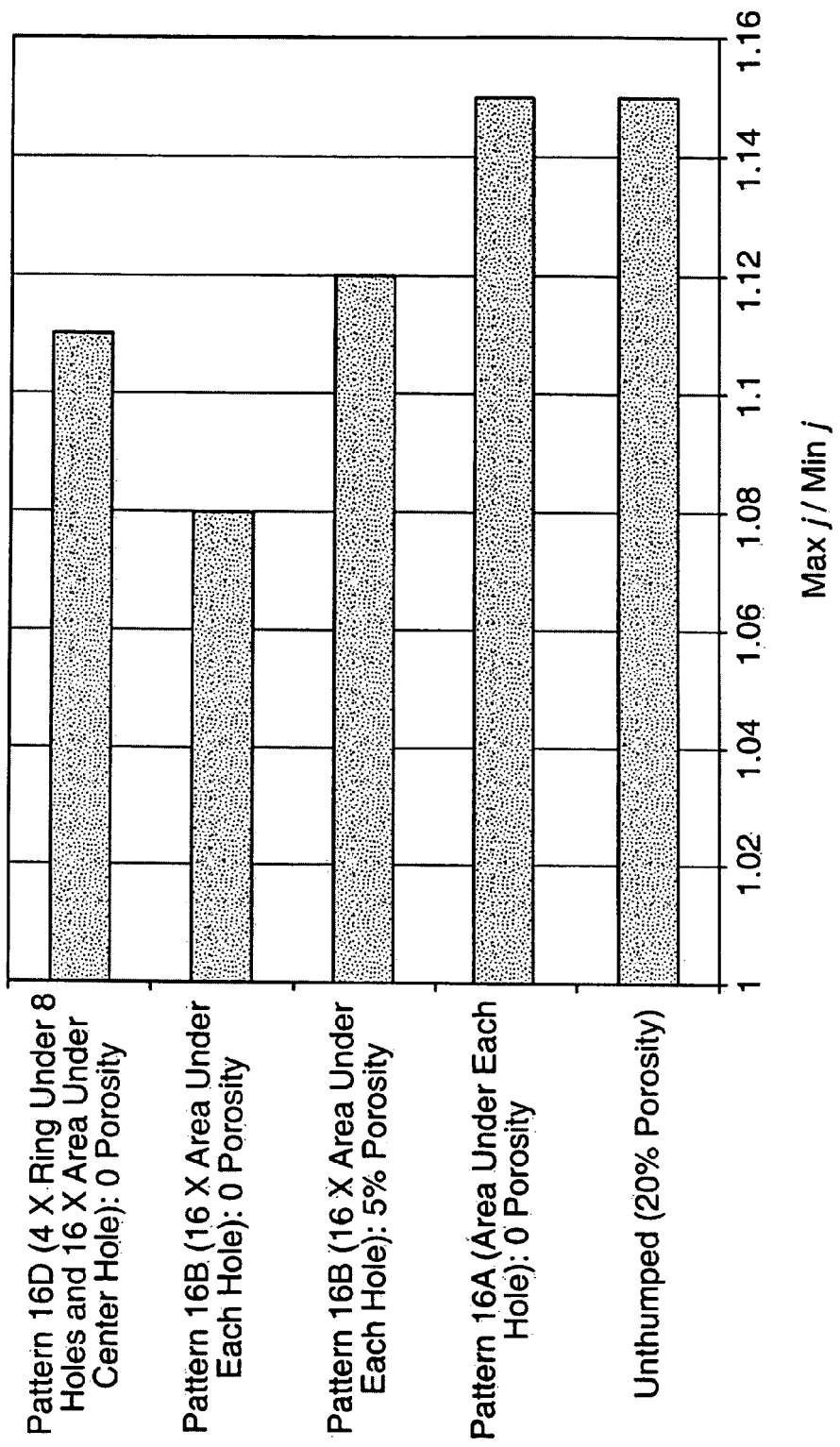
FIG. 21 is a plot of maximum current density/minimum current density for the patterns of FIGS. 16A-16D.

Referring to FIG. 21, the ratio of maximum local current density to mean local current density is plotted for several cases. In the unthumped case, the maximum is 1.15 times the mean. Thumping pattern 16A showed no effect on this maximum. In thumping pattern 16B, however, where 16 times the area, under each hole was thumped, a significant decrease in the maximum local current density at 5 mA is observed. This narrowing of the range becomes more pronounced as the final porosity is decreased. The ratio of maximum to mean goes to 1.08 as the final porosity approaches 0. Although pattern 16D also shows a narrowing of the range, its effect is not as significant as that of pattern 16B. In pattern 16D, the thumping is not symmetric with respect to the holes. This asymmetry contributes to current non-uniformity.

Selective thumping of the Teflon disc can be used to significantly extend the activated shelf life. In these illustrative simulations, thumping can extend the shelf life to twice that of the unthumped case. The smaller the final porosity and the greater the thumped area, the greater the increase in shelf life. This improvement in shelf life comes at the cost of decreased limiting current, because shelf life is inversely proportional to limiting current. Thus, in choosing a thumping pattern, the maximum current to be sustained by the cell should be determined. For maximum activated shelf life, a thumping pattern and porosity can then be chosen to give a limiting current somewhat higher than this maximum current.

Furthermore, as seen from FIG. 19, there are multiple thumping patterns and porosities that will provide the same limiting current. For example, if a limiting current equal to 80% that of the unthumped case is desired, pattern 16C thumped to 2% porosity and patterns 16B and 16D thumped to 11% porosity can all be effective. In fact, although, only several patterns were simulated here, there are an infinite number of conceivable patterns and porosities that would provide the desired limiting current. To choose which of these is preferable, both manufacturing and current distribution should be considered. With respect to current distribution, in some circumstances, patterns in which areas of high local current density (in the unthumped case) are thumped will be optimal. Such patterns can shift some of the load from these regions to other regions, thus smoothing out the current distribution. The areas of highest current density (in the unthumped case) are right under the holes, with the current density decreasing gradually as distance from the holes is increased. To a first approximation, the optimal thumping pattern should therefore include circular regions (of size and porosity determined by the desired limiting current) centered on the holes, as in patterns 16A and 16B. If this is not feasible from a manufacturing standpoint, other patterns, such as 16C and 16D, may be utilized. In some cases, the first priority may be to choose the appropriate limiting current, thereby optimizing the shelf life, and the second priority may be to choose a thumping pattern that will provide such a limiting current and also smooth out the current distribution within manufacturing constraints.

Figure 22:
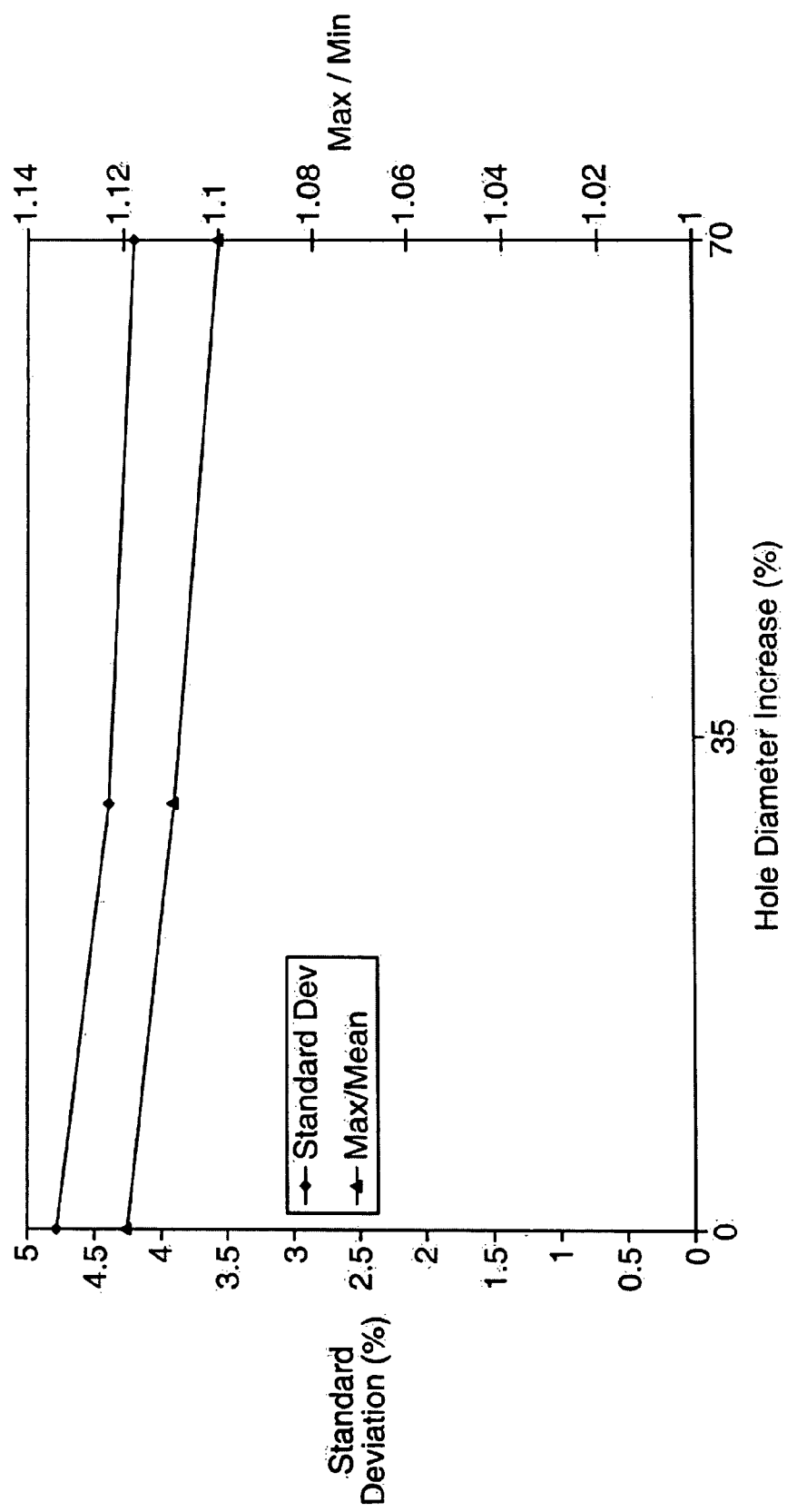
FIG. 22 shows plots of standard deviation and Max/Min as a function of increases, in air access opening diameter.
Figure 23:
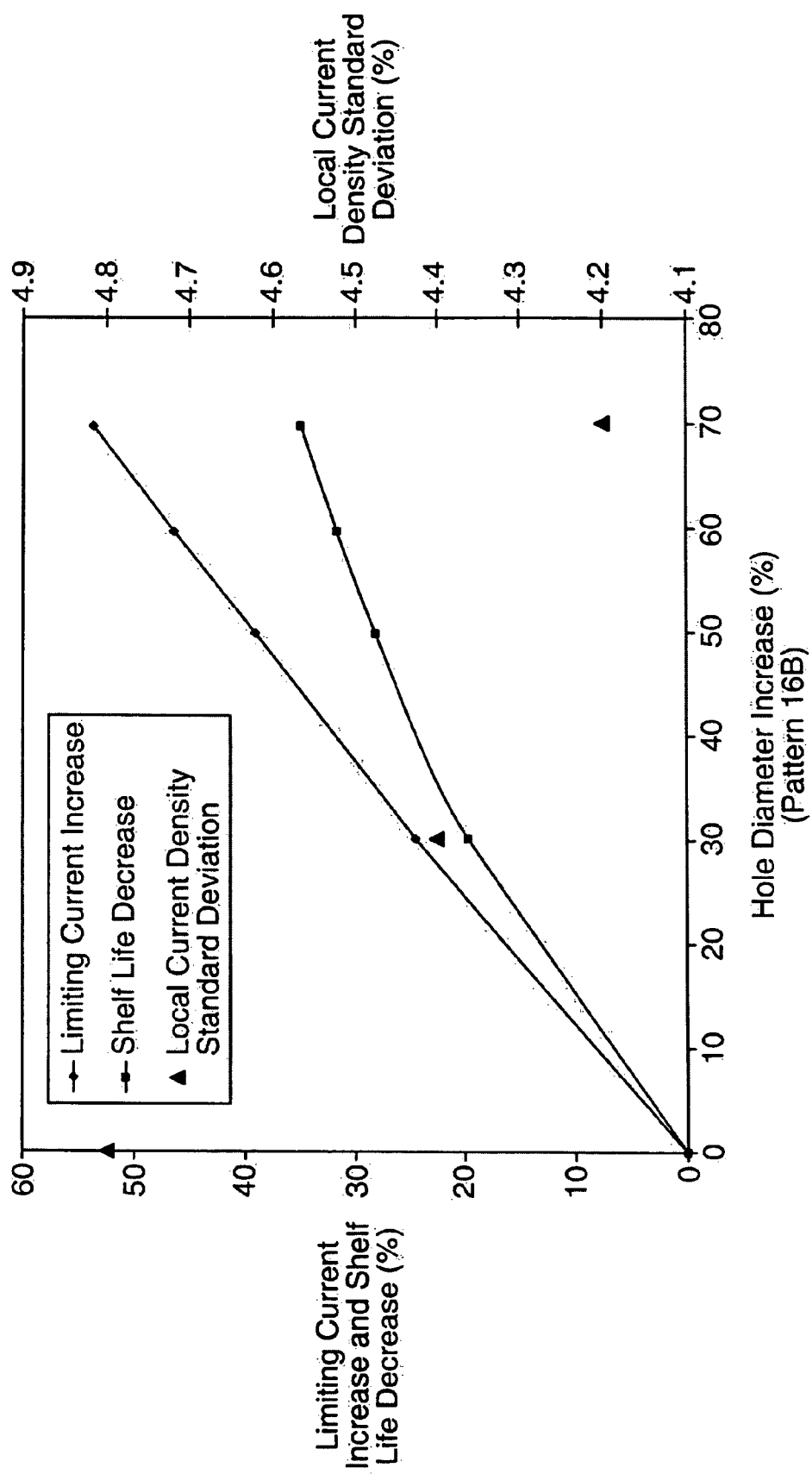
FIG. 23 shows plots of changes in limiting current and shelf life, and changes in current density standard deviation as a function of changes in air access opening diameter.
Figure 24:
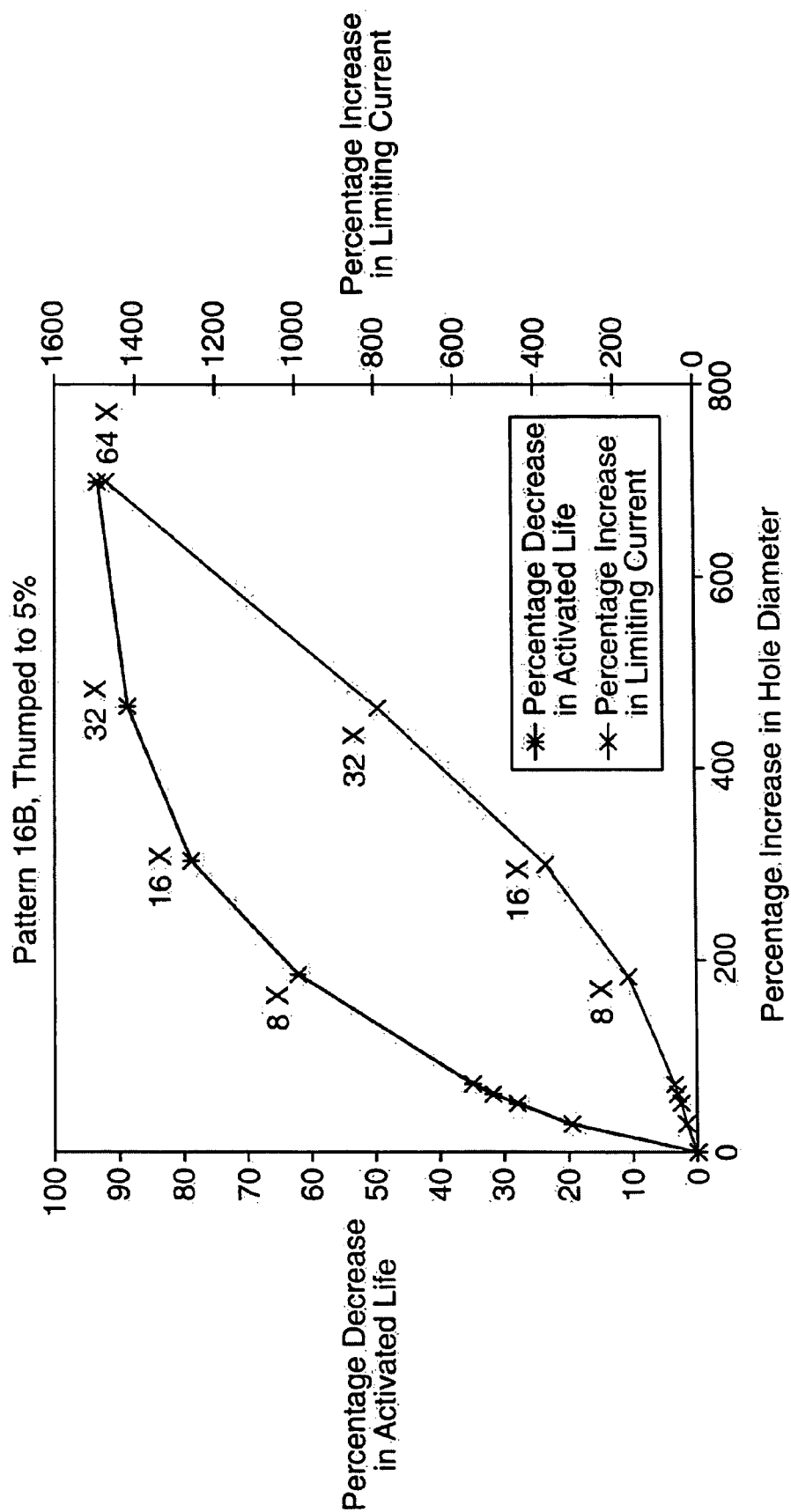
FIG. 24 shows plots of changes in activated life and changes in limiting current as a function of changes in air access opening diameter.

As discussed above, the dimensions of the air access openings can be designed, e.g., increased or decreased, to affect a cell's performance. FIG. 22 shows plots of standard deviation and Max/Min as a function of increases in air access opening diameter. FIG. 23 shows plots of changes in limiting current and shelf life, and changes, in current density standard deviation as a function of changes in air access opening diameter. FIG. 24 shows plots of changes in activated life and changes in limiting current as a function of changes in air access opening diameter. The barrier layer was modified to 5% final porosity. The modified pattern was similar to pattern 16A in which only the area directly under each hole was modified, e.g., thumped.

All publications and patents mentioned in this application are herein incorporated by reference to the same extent as if each individual publication or patent was specifically and individually indicated to be incorporated by reference.

Other embodiments are within the claims.

What is claimed is:

1. A battery, comprising:
   a cathode comprising an active cathode mixture coated on a cathode current collector arranged as a tube having two longitudinally-extending ends that have been connected together to form a seam, the cathode having an interior surface and an exterior surface, the cathode defining a cavity and two open ends;
   a longitudinally-extending positive tab connected to the cathode current collector;
   a separator disposed adjacent to the interior surface of the cathode;
   an anode disposed adjacent to the separator and inside the cavity;
   an air-permeable, liquid-impermeable barrier layer disposed adjacent to the exterior surface of the cathode, the barrier layer defining an exterior surface of the battery;
   two end members connected to the open ends of the cathode; and
   an anode current collector extending through the two end members wherein the positive tab is connected to the current collector along the seam; and further comprising a longitudinally-extending strip of sealant disposed over the positive tab.

2. The battery of claim 1, wherein the barrier layer comprises polytetrafluoroethylene.

3. The battery of claim 1, wherein the end members are configured to mate with the cathode and align with the cathode along a longitudinal axis of the battery.

4. The battery of claim 1, further comprising a conductive tab connected to the anode current collector.

5. The battery of claim 1, wherein the end members and the cathode are connected by a sealant.

6. The battery of claim 1, wherein the end members comprise an electrically-insulating material.

7. The battery of claim 1, wherein the cathode has a substantially rectangular cross section.

8. The battery of claim 1, wherein the cathode has a substantially square cross section.

9. The battery of claim 1, wherein the cathode has a substantially triangular cross section.

10. The battery of claim 1, wherein the cathode has a substantially circular cross section.

11. The battery of claim 1, wherein the battery is a metal-air battery.

12. An article, comprising:
    a housing; and
    the battery of claim 1 inside the housing;
    wherein the housing is adapted to manage air flow into and out of the housing.

\* \* \* \* \*

UNITED STATES PATENT AND TRADEMARK OFFICE
CERTIFICATE OF CORRECTION

| | | |
|---|---|---|
| PATENT NO. | : 7,704,621 B2 | Page 1 of 1 |
| APPLICATION NO. | : 11/397771 | |
| DATED | : April 27, 2010 | |
| INVENTOR(S) | : G. Steven Kelsey et al. | |

It is certified that error appears in the above-identified patent and that said Letters Patent is hereby corrected as shown below:

On the Title Page, item 60 please insert --Related U.S. Application Data This application claims priority under 35 USC §119(e) to U.S. Serial No. 10/060,701, filed January 30, 2002, and entitled "Batteries and Battery Systems", which claims priority from U.S. Provisional Patent Application Serial No. 60/265,822, filed on February 1, 2001, and entitled "Battery", the entire contents of which are hereby incorporated by reference.--

Signed and Sealed this

Thirteenth Day of July, 2010

David J. Kappos
*Director of the United States Patent and Trademark Office*